United States Patent
Xu et al.

(10) Patent No.: US 10,109,055 B2
(45) Date of Patent: Oct. 23, 2018

(54) MULTIPLE HYPOTHESES SEGMENTATION-GUIDED 3D OBJECT DETECTION AND POSE ESTIMATION

(71) Applicant: Seiko Epson Corporation, Tokyo (JP)

(72) Inventors: Liwen Xu, North York (CA); Joseph Chi Tai Lam, North York (CA); Alex Levinshtein, Maple (CA)

(73) Assignee: SEIKO EPSON CORPORATION, Tokyo (JP)

( * ) Notice: Subject to any disclaimer, the term of this patent is extended or adjusted under 35 U.S.C. 154(b) by 156 days.

(21) Appl. No.: 15/356,848

(22) Filed: Nov. 21, 2016

(65) Prior Publication Data
US 2018/0144458 A1     May 24, 2018

(51) Int. Cl.
| G06T 19/00 | (2011.01) |
| G06K 9/46 | (2006.01) |
| G06T 7/00 | (2017.01) |
| G06K 9/62 | (2006.01) |
| H04N 13/204 | (2018.01) |

(52) U.S. Cl.
CPC .......... *G06T 7/004* (2013.01); *G06K 9/4604* (2013.01); *G06K 9/6202* (2013.01); *G06K 9/6269* (2013.01); *G06T 7/0081* (2013.01); *H04N 13/204* (2018.05); *G06T 2207/10028* (2013.01)

(58) Field of Classification Search
CPC ..... G06T 7/11; G06T 7/74; G06T 7/75; G06T 7/73; G06T 2200/04; G06T 2207/10028; G06T 2207/10012; G06K 9/00214
See application file for complete search history.

(56) References Cited

U.S. PATENT DOCUMENTS

2017/0109611 A1* 4/2017 Luo ............... G06K 9/6263
                                              382/154

OTHER PUBLICATIONS

3D Object Recognition by Surface Registration of Interest Segments, Joseph Lam and Michael Greenspan, Dept. Electrical & Computer Engineering, Queen's University, Kingston, Canada, School of Computing, Queen's University, Kingston, Canada, Jan. 2003, (pp. 1-8).
An Efficient RANSAC for 3D Object Recognition in Noisy and Occluded Scenes, Chavdar Papazov and Darius Burschka, Technische Universitat Munchen, Germany, Jan. 2010, (pp. 1-14).
Fast 3D Recognition and Pose Using the Viewpoint Feature Histogram, Radu Bogdan Rusu, Gary Bradski, Romain Thibaux and John Hsu, Willow Garage, Oct. 2010, (pp. 1-8).

(Continued)

*Primary Examiner* — Brian Werner
(74) *Attorney, Agent, or Firm* — Oliff PLC

(57) ABSTRACT

A machine vision system and method uses captured depth data to improve the identification of a target object in a cluttered scene. A 3D-based object detection and pose estimation (ODPE) process is use to determine pose information of the target object. The system uses three different segmentation processes in sequence, where each subsequent segmentation process produces larger segments, in order to produce a plurality of segment hypotheses, each of which is expected to contain a large portion of the target object in the cluttered scene. Each segmentation hypotheses is used to mask 3D point clouds of the captured depth data, and each masked region is individually submitted to the 3D-based ODPE.

20 Claims, 19 Drawing Sheets

(56) References Cited

OTHER PUBLICATIONS

Model Globally, Match Locally: Efficient and Robust 3D Object Recognition, Proceedings/CVPR, IEEE Computer Society Conference on Computer Vision and Pattern Recognition, Jul. 2010, (pp. 1-9).
Using Spin Images for Efficient Object Recognition in Cluttered 3D Scenes, Andrew E. Johnson and Martial Hebert, Member, IEEE, IEEE Transactions on Pattern Analysis and Machine Intelligence, vol. 21, No. 5, May 1999, (pp. 433-449).

* cited by examiner

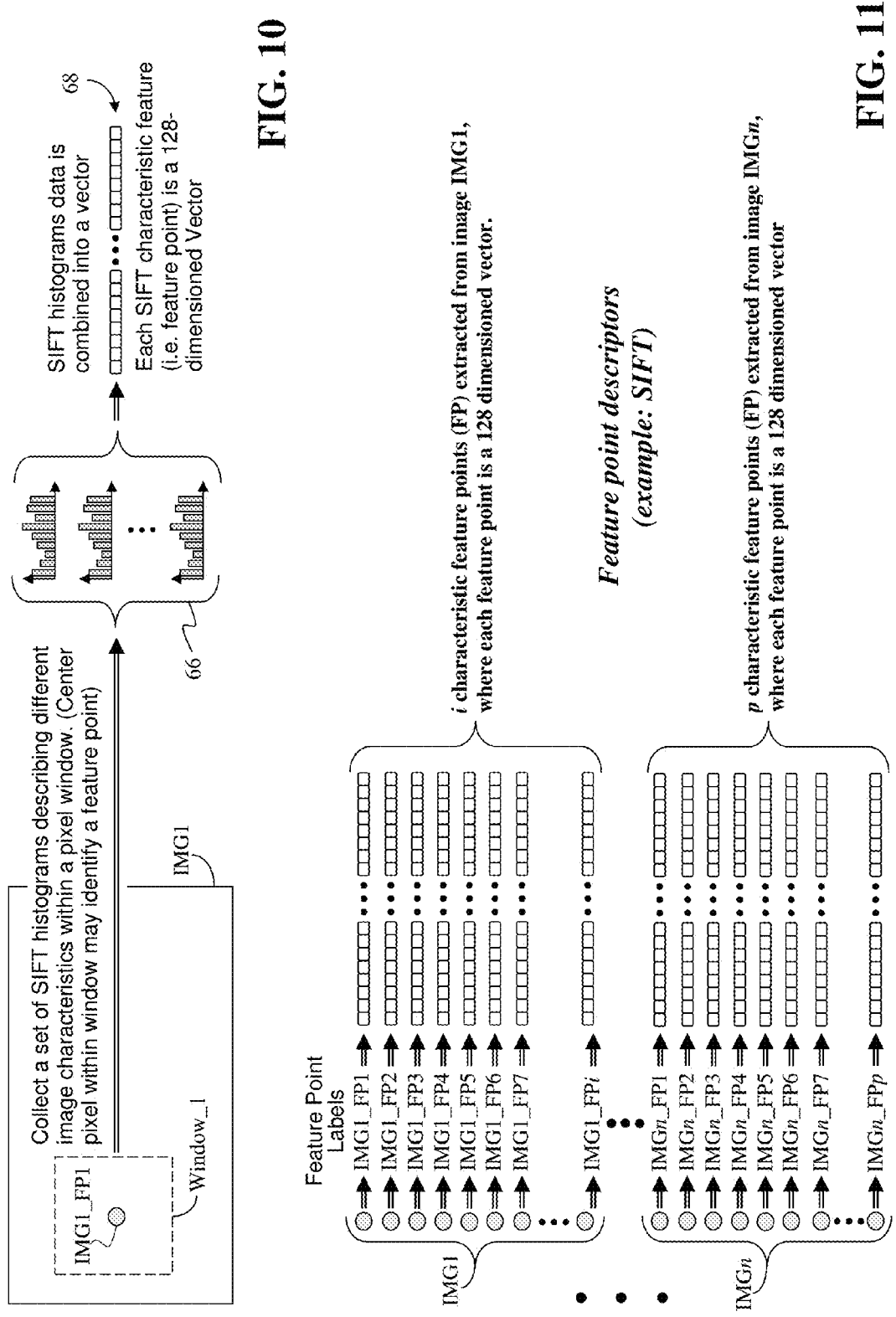

| Steps | Actions | Output |
|---|---|---|
| 1 | Check size of (1) (too small) | [ ] |
| 2 | (1)+(2) and check total size (valid) | [(1,2)] |
| 3 | (1,2)+(3) and check total size (valid) | [(1,2), (1,2,3)] |
| 4 | (1,2,3)+(4) and check total size (too big) -> stop | [(1,2), (1,2,3)] |
| 5 | (1,2)+(4) and check total size (valid) | [(1,2), (1,2,3), (1,2,4)] |
| 6 | (1,2,4)+(3) combination checked before -> stop | [(1,2), (1,2,3), (1,2,4)] |
| 7 | (1)+(3) and check total size (valid) | [(1,2), (1,2,3), (1,2,4), (1,3)] |
| 8 | (1,3)+(2) combination checked before -> stop | [(1,2), (1,2,3), (1,2,4), (1,3)] |
| 9 | (1,3)+(4) and check total size (valid) | [(1,2), (1,2,3), (1,2,4), (1,3), (1,3,4)] |
| 10 | (1,3,4)+(2) combination checked before -> stop | [(1,2), (1,2,3), (1,2,4), (1,3), (1,3,4)] |

MULTIPLE HYPOTHESES SEGMENTATION-GUIDED 3D OBJECT DETECTION AND POSE ESTIMATION

BACKGROUND

Field of Invention

The present invention is generally directed to the field of machine vision and robotic manipulation of objects. More specifically, it is directed towards machine recognition and manipulation of pre-specified target object types, such as specific types of assembly components, by visual inspection in a cluttered environment/scene.

Description of Related Art

In the field of automated, or robotic, manufacturing or assembly, the ability to identify assembly components, manipulate and attach them to other components is very important. Often, this is achieved by use of assembly stations, where each assembly station is limited to one component having one known orientation and position, and requiring simplified manipulation.

It would be advantageous, however, for a machine to be able to visually select a needed component from a supply of multiple components in a cluttered environment, identify any key assembly features of the component, and manipulate the selected component as needed for assembly. This would require that the machine have some capacity for machine vision (computer vision), object recognition and manipulation. In the present context, the term "cluttered" is used in its usual meaning. That is, a cluttered environment (or scene) is one covered (at least partially) with multiple objects in a disorderly fashion, with objects overlaid or otherwise obscuring each other fully or partially, including in a random or haphazard manner. The objects in the cluttered scene may be multiple instances (copies) of the same object, or may include different types of objects.

Most previous efforts in machine vision have focused on uncluttered scenes under controlled conditions. In order to better appreciate some of the difficulties associated with computer vision in a cluttered environment, it may be beneficial to first discuss how computer vision has previously been used in the field of machine (or computer or robotic) vision. Two important aspects of robotic vision are the identifying of an object and the estimating of its pose, i.e. its 3-dimensional (3D) orientation relative to a known reference point and/or plane.

Early work in object recognition focused on 2-dimensional (2D) images, but much work has recently been applied to 3D images. With some effort, ideas developed for 2D object recognition have found analogs (similar applications) in 3D object recognition techniques. Although the mechanics (or algorithm steps) are not usually the same when adapting a 2D technique to a 3D image, some concepts (or objectives) do remain similar. Thus, an understanding of object recognition in general, and particularly in 2D images, may also be helpful to understand object recognition techniques in 3D images.

Since most cameras take 2D images, many approaches attempt to identify objects in a 2D image and infer some 3D information from the 2D image. For example, in "Class-specific grasping of 3D objects from a single 2D image", by Chiu et al. *The 2010 IEEE/RSJ International Conference on Intelligent Robots and Systems*, Oct. 18-22, 2010, Chiu et al. describe superimposing 2D panels in the form of simplified 2D shapes on the surface of objects in a 2D image. The 2D panels on each imaged object form a set that defines the object in the 2D image. The generated 2D panels can then be compared with a library of panel sets, where each panel set defines a different type of predefined 3D object, such as a car. Each library panel set is compared from different view directions with the generated 2D panels of the imaged object in an effort to find a relatively close match. If a match is found, then in addition to having identified the object, one has the added benefit of having a good guess as to its orientation, given the known orientation of the matched 2D panel set in the library.

As is stated above, however, identifying a desired object in an image is only part of the solution. One further needs to discern information about the viewed object's pose, or orientation in 3D space, and possible movement through 3D space. Various approaches have been used to address this need.

For example, in "3D Pose Estimation for Planes", by Xu et al. *Computer Vision Workshops (ICCV Workshops)*, 2009 IEEE 12th International Conference on Sep. 27 2009-Oct. 4 2009. Xu et al. describe using a plane outline on the surface of a target object in a non-stereo, 2D, image, and estimating the plane's normal direction to estimate the object's pose orientation.

A second example is found in "Robust 3D Pose Estimation and Efficient 2D Region-Based Segmentation from a 3D Shape Prior", by Dambreville et al. *European Conference on Computer Vision ICCV*, 2008. Dambreville et al. describe segmenting a rigid, known, target object in a 2D image, and estimating its 3D pose by fitting onto the segmented target object the best 2D projection of known 3D poses of the known target object.

Returning to the subject of computer vision, it is generally desirable that an image not only be captured, but that a computer be able to identify and label (i.e. recognize) various objects (or features) within the captured image. Basically, a goal of computer vision is for the computer to duplicate the abilities of human vision by electronically perceiving and understanding the contents of a captured image. This involves extracting symbolic information from image data using models constructed with the aid of geometry, physics, statistics, and learning theory. Thus, the field of computer vision includes methods for acquiring, processing, analyzing, and gleaning an understanding of imaged objects, in order to form decisions.

Various approaches for identifying features within a captured image are known in the industry. Many early approaches centered on the concept of identifying shapes. For example, if a goal was to identify a specific item (object), such as a wrench or a type of wrench, then a library of the different types of acceptable wrenches (i.e. examples of "true" wrenches) would be created. The outline shapes of the true wrenches would be stored, and a search for the acceptable outline shapes would be conducted on a captured image.

Outline shapes within a captured 2D image might be identified by means of a segmentation process, which is a process by which the outlines (or masks) of foreground objects within a digital image are defined by differentiating the image's foreground pixels from the image's background pixels. This would define an outline of the foreground object, such as a wrench, and the defined outline could then be compared with a library of known wrench outlines in various pose positions. This approach of searching for the outline of a known shape was successful when one had an exhaustive library of acceptable outline shapes, the library of known outline shapes was not overly large, the outline shape of the target object within the digital image did not deviate much from the predefined true outline shapes, and the background surrounding the target object was not cluttered (i.e. overly complicated).

For complex searches, however, this approach is not effective. The limitations of this approach become readily apparent when the subject (i.e. object) being sought within an image is not static (i.e. non-rigid), but is prone to change and/or deformation. For example, a human face has definite characteristics, and its distortion is limited, but it still does not have an easily definable number of shapes and/or appearance it may adopt. It is to be understood that the term appearance is herein used to refer to color and/or light differences across an object, as well as other surface/texture variances. Although in an assembly line environment, a robot may not be required to identify objects as complicated as a human face, it is still helpful to look at some of the computer vision approaches used in face recognition, as some aspects in this field can be applied to computer vision, in general.

Developments in image recognition of objects that change their shape and appearance, are discussed in "Statistical Models of Appearance for Computer Vision", by T. F. Cootes and C. J. Taylor (hereinafter Cootes et al.), Imaging Science and Biomedical Engineering, University of Manchester, Manchester M13 9PT, U.K. email: t.cootes@man.ac.uk, at hypertext address www.isbe-.man.ac.uk, Mar. 8, 2004, which is hereby incorporated in its entirety by reference.

To better mimic human vision, it is advantageous for machines to incorporate stereo vision (i.e. depth perception), and thereby obtain depth information from captured images. Images of a common scene taken from different view angles are the basis for stereo vision and depth perception. In this case, corresponding feature points in two images taken from different view angles (and/or different fields of vision) of the same subject (or scene) can be combined to create a perspective view of the scene. Thus, imaging a scene from two different view points (i.e. from two different field-of-views, FOVs) creates stereo vision, which provides depth information about objects in the scene.

This ability would be particularly helpful in the field of robotics and automated assembly/construction. In these applications, a machine having stereo vision and the ability to discern (i.e. identify) target items would ideally have the ability to independently retrieve the target item and use it in an assembly.

Implementing such vision capabilities, however, is still challenging, particularly in a cluttered scene, even if the number of possible target object is limited.

It is an object of the present invention to provide a machine vision system for identifying and manipulating a target object in a cluttered environment for use in robotic assembly lines.

It is a further object of the present invention to make use of 3D information for determining pose information of the target object.

SUMMARY OF INVENTION

The above objects are met in a method (such as for head-mounted display or machine vision applications) of determining a position and pose orientation of a physical target object in a scene, the method including: using a depth map image capture device to capture a depth map image of the target object in the scene (the captured depth map image may be termed a depth-map test image); using a data processing device to implement the following steps (assuming that the depth-map test image of the target object in the scene is assessed): submitting the depth-map (test) image to a first three-dimensional (3D) segmentation process to produce a (it may be submitted multiple times, each submission of the first 3D segmentation process producing a corresponding and independent) set of first 3D segments of the same region of the depth-map (test) image; (if multiple sets are produced, then collecting all sets of first 3D segment pieces into a composite unit) submitting the set of first 3D segments (or composite unit) to a second 3D segmentation process different from the first segmentation process, the second 3D segmentation process combining select groups of first 3D segments (from the composite unit) into combinations of first 3D segments, each combination of first 3D segments defining a 3D segment patch; submitting the segment patches to a third 3D segmentation process different than the first 3D segmentation process and the second 3D segmentation process, the third 3D segmentation process combining select 3D segment patches into combinations of 3D segment patches, each combination of segment patches defining a segment hypothesis; using individual segment hypothesis as masks to isolate corresponding masked regions of the depth-map (test) image; identifying one of the isolated masked regions based on a library of training 3D descriptors; and deriving a position and pose orientation of the target object based at least on the identified masked region.

The last two steps may alternatively be implanted by submitting each masked region of the depth-map test image to an object detection and pose estimation (ODPE) process, the ODPE process including a step of extracting test 3D descriptors from the submitted masked region of the depth-map test image and comparing the extracted test 3D descriptors to a library of training 3D descriptors to search for substantially matching 3D descriptors, the training 3D descriptors being extracted from training objects with known pose orientation, any submitted masked region of the depth-map that is identified as matching a training object by the ODPE being correlated to its matched training object, the identified masked region being identified as containing the target object, the location of the identified masked region being assigned to the target object, and the pose orientation of the identified masked region's correlated training object being assigned to the target object.

Preferably, the third 3D segmentation process defines an adjacency matrix of all the 3D segment patches.

Further preferably, the third 3D segmentation process defines a graph whose vertices are individual 3D segment patches, and uses the graph to construct the adjacency matrix.

The adjacency matrix may then be used to identify segment patches whose minimum Euclidean distance in 3D space is not greater than a predefine threshold distance greater than zero as being adjacent.

Additionally, in an embodiment of the present invention, the third 3D segmentation process defines a search tree based on adjacency of 3D segment patches as defined by the adjacency matrix, the search tree having a plurality of nodes and branches, each node being associated with a 3D segment patch; the third 3D segmentation process defines new combinations of 3D segment patches by traversing the branches of the search tree downward along a traverse path from the top-most node of the search tree, wherein each reached node in the traversing of a branch defines a new combination of 3D segment patches as the collection of 3D segment patches associated with a currently reached node plus all parent nodes up its current branch to the top-most node; the third 3D segmentation process submits each newly defined combination of 3D segment patches at each node along a current traverse path to a validity test that determines whether the new combination of 3D segment patches is valid or invalid; if the new combination of 3D segment patches is determined to be valid by the validity test, then new combination of 3D segment patches is output as a segment hypothesis and the third 3D segmentation process continues to the next node along the current traverse path, else the new combination of 3D segments is discarded and not issued as a segment hypothesis, traversing of the current traverse path is terminated, the third 3D segmentation process moves up the current branch until it encounters a fork in the search tree not previously traversed and then proceeds to traverse downward a previously not traversed branch from the encountered fork.

Preferably, the validity test includes determining if a current combination of 3D segment patches is novel, defined as not having previously been encountered in any previous traversing of the branches.

In an embodiment of the present invention, the validity test includes criterion based on location and shape.

The validity test may include determining if the size of a current combination of 3D segments is not less than a minimum size ($S_{lower}$) and not greater than a maximum size ($S_{upper}$). The minimum size may be defined as two 3D segment patches, and the maximum size may be defined as four 3D segment patches.

Alternatively, the third 3D segmentation process may combine select 3D segment patches into segment hypotheses by: (a) selecting a random one of said 3D segment patches as a working patch for a current iteration; (b) combining the working patch with a neighboring 3D segment patch to define a current patch combination; (c) if the resultant size of the current patch combination is less than a minimum size ($S_{lower}$), then re-designating the current patch combination as the working patch and returning to step (b); (d) if the resultant size of the current patch combination is greater than a maximum size ($S_{upper}$), then discarding the current patch combination and returning to step (a); (e) if the current patch combination has not been encountered in any previous iteration, then defining the current patch combination is a segment hypothesis, and returning to step (b).

The above objects are also met in a robot implementing the machine vision method(s) described above, the robot having a manipulating arm, wherein the robot uses the above-described machine vision method(s) to identify a target assembly component among a clutter of components, and uses the manipulating arm to pick up the identified target assembly component.

Preferably, each segment hypothesis includes at least half the volume of the target object.

If it further preferred that the first 3D segmentation process produce overlapping first 3D segments.

In an embodiment of the present invention, the first 3D segmentation process is an over-segmentation process.

Preferably, the second 3D segmentation process is a local convexity connected patch method.

Further preferably, the first 3D segments are supervoxels.

Additionally, the scene is preferably a cluttered scene.

The above objects are also met in a machine vision system, including: a depth map image capture device; a manipulating arm for grasping a target object in a scene; and a data processing device determining a position and pose orientation of the target object in the scene, and controlling the manipulating arm based on the determined position and pose orientation, the data processing device implementing the following processing steps: using the depth map image capture device to capture a depth map image of the target object in the scene, the captured depth map image being a depth-map test image; submitting the depth-map test image to a first three-dimensional (3D) segmentation process multiple times, each submission of the first 3D segmentation process producing a corresponding, and independent, set of first 3D segments of the same region of the depth-map test image; collecting all sets of first 3D segment pieces into a composite unit; submitting the composite unit to a second 3D segmentation process different from the first segmentation process, the second 3D segmentation process combining select groups of first 3D segments from the composite unit into combinations of first 3D segments, each combination of first 3D segments defining a 3D segment patch; submitting the segment patches to a third 3D segmentation process different than the first 3D segmentation process and the second 3D segmentation process, the third 3D segmentation process combining select 3D segment patches into combinations of 3D segment patches, each combination of segment patches defining a segment hypothesis; using individual segment hypothesis as masks to isolate corresponding masked regions of the depth-map test image; submitting each masked region of the depth-map test image to an object detection and pose estimation (ODPE) process, the ODPE process including a step of extracting test 3D descriptors from the submitted masked region of the depth-map test image and comparing the extracted test 3D descriptors to a library of training 3D descriptors to search for substantially matching 3D descriptors, the training 3D descriptors being extracted from training objects with known pose orientation, any submitted masked region of the depth-map that is identified as matching a training object by the ODPE being correlated to its matched training object, the identified masked region being identified as containing the target object, the location of the identified masked region being assigned to the target object, and the pose orientation of the identified masked region's correlated training object being assigned to the target object.

In the present machine vision system, it is preferred that the third 3D segmentation process defines an adjacency matrix of all the 3D segment patches; the third 3D segmentation process defines a search tree based on adjacency of 3D segment patches as defined by the adjacency matrix, the search tree having a plurality of nodes and branches, each node being associated with a 3D segment patch; the third 3D segmentation process defines new combinations of 3D segment patches by traversing the branches of the search tree downward along a traverse path from the top-most node of the search tree, wherein each reached node in the traversing of a branch defines a new combination of 3D segment patches as the collection of 3D segment patches associated with a currently reached node plus all parent nodes up its current branch to the top-most node; the third 3D segmentation process submits each newly defined combination of 3D segment patches at each node along a current traverse path to a validity test that determines whether the new combination of 3D segment patches is valid or invalid; if the new combination of 3D segment patches is determined to be valid by the validity test, then new combination of 3D segment patches is output as a segment hypothesis and the third 3D segmentation process continues to the next node along the current traverse path, else the new combination of 3D segments is discarded and not issued as a segment hypothesis, traversing of the current traverse path is terminated, the third 3D segmentation process moves up the current branch until it encounters a fork in the search tree not previously traversed and then proceeds to traverse downward a previously not traversed branch from the encountered fork.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIGS. 10 and 11 provide an overview of the feature point extraction function of SIFT.

FIG. 21 is table showing multiple steps in the processing of the search tree of FIG. 20 to identify valid segment hypotheses.

DESCRIPTION OF THE PREFERRED EMBODIMENTS

Figure 1:
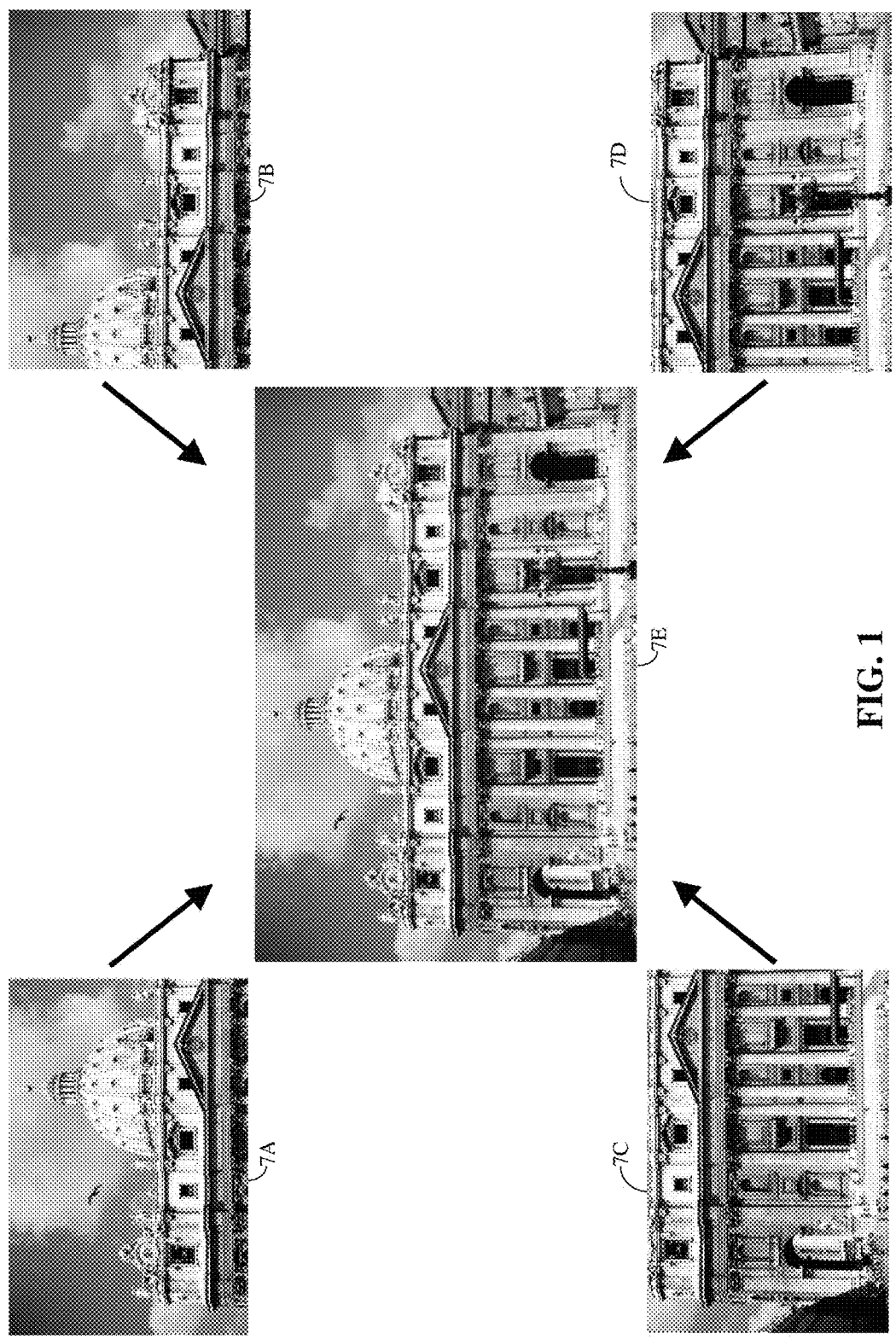
FIG. 1 illustrates the use of corresponding feature points in different images to stitch together the images to create a larger composite image.

Automated manipulation of assembly components (i.e. parts) is critical to the manufacture of many items. There is a need for a robot (or machine of other type) to be able to visually identify an assembly component, and to discern the component's pose (i.e. orientation or arrangement) in order to properly manipulate the component. There is a further need for recognition of the assembly component in a cluttered scene, i.e. to identity a specific target component among a pile of such components or among a cluttered collection of different assembly component/part types.

It is presently preferred that such an automated system be able to receive 3-dimensional (3D) images (i.e. perspective images), which provide depth information about a scene, such as an assembly line, to identify a target object in the scene, and to extract pose information of the target object.

The 3D images of target objects may be produced by means of a 3D imaging system, such as a 3D laser scanner, a MICROSOFT CORP. KINECT sensor, a range camera, or any of many different types of time-of-flight devices. A 3D image (depth image or depth data image) may also be generated from a stereo pair of 2D images. 3D images may also be produced using a stereo imaging system, which extracts 3D information from a pair of stereoscopic images (i.e., a stereoscopic image pair). As it is known in the art, each respective image in a stereoscopic image pair is produced by a respective one of two 2D imaging cameras spaced apart to provide two views of a common scene.

Irrespective of the 3D imaging technique used, it is desirable that the 3D imaging technique produce a point cloud of the imaged 3D object. As it is known in the art, a point cloud is a collection of points in 3D space that approximate surfaces of a 3D object. If desired, the point cloud may be converted to other formats of defining depth information, such as the use of voxels, which define a volume point in 3D space.

As is mentioned above, a 3D image may be generated from a stereo pair of 2D images (i.e. a stereoscopic (or stereo) image pair). Each of the two 2D images in a stereoscopic image pair is produced by a respective one of two 2D imaging cameras spaced apart to provide two views (i.e. two fields-of-view, FOV, images or angle views) of a common scene. By means of stereo constraints, point (or pixel) information of corresponding pixels in the two views is combined to create a perspective (3D) view, which includes point cloud information. Thus, a point cloud generated from a stereoscopic image pair intrinsically includes a correlation between points of the point cloud and points (e.g. pixels or regions) in the two 2D images of the stereoscopic image pair. Although any method of obtaining depth information (i.e. a depth image), which includes a point cloud, may be used, for illustration purposes an exemplary implementation of the present invention may make use of a point cloud generated from a stereo pair of 2D images.

Therefore before proceeding with a discussion of how to the present invention identifies a target object in a cluttered image and how it determines pose information from a 3D image (depth image, or point cloud), it may be beneficial to first provide a general discussion of how 3D information (perspective information) may be extracted from a stereoscopic pair of 2D images since some image processing techniques are more easily understood when applied to 2D images.

In order to extract 3D information from a stereoscopic image pair, one first needs to be able to identify commonly imaged items in the stereoscopic image pair. A common way to do this is to calibrate the two cameras, and to identify a known point of reference in a specific scene. A less restrictive approach would eliminate the need to calibrate the cameras to a specific scene. However, since both images of the stereoscopic image pair provide different views, this can be a difficult task. One needs to recognize different views of the same objects in two 2D image scenes, and to correlate specific parts of the commonly imaged objects.

Object recognition (or object identification) is thus an integral part of computer vision, and an integral part of object recognition is pattern matching. An essential component of pattern matching in images is feature (or descriptor) detection, which refers to identifying parts of an image, or individual feature points (or descriptors) of an image (such as individual pixels in the case of 2D images or voxels in the case of 3D images), that are good candidates for investigation to determine if they might be part of a sought after object in an image. As it is known in the art, pixels are picture elements on a 2D grid (bitmap) that together make up a 2D image. As it is also known in the art, (in a manner analogous to pixels but applied to depth images) voxels are volumetric picture elements (or 3D volume units/points) on a regular grid in 3D space that together makes up a 3D image.

In 2D images, the size, or resolution, of the 2D image is dependent on its pixel density (pixels per inch, or ppi). The higher the pixel density, the more information the image contains. However, the more information contained in an image, the more computer resources/time needed to process it. In order to increase the speed by which a 2D image is processed, the concept of superpixel was introduced, which increases the size of a pixel, or redefines a collection of pixels into a single superpixel, and thus reduces the image's resolution. An example of this may be pixilation of an image, where a 2D image takes on a grid-like appearance depending upon the increased size of the superpixels. Superpixels may also be defined by over-segmenting an image, which breaks up individual objects into multiple pieces (or segments), rather than segmenting the entire object from its surroundings. In this case, each over-segmented image piece may be redefined as a superpixel. It is to be understood that although the discussion provided below describes the processing of pixels, it may be expanded to be applied to superpixels.

The concept of superpixels has carried over to the field of depth data. A depth image may be oversegmented (i.e. objects divided into multiple 3D pieces), where each 3D piece is comprised of a plurality of what would be typical voxels. In this case, however, each individual, over-segmented, 3D piece is defined as a supervoxel. Each supervoxel is thus larger than a typical voxel. Although superpixels may lose too much information for many applications, it has been found that supervoxels adhere to object boundaries better than state-of-the-art 2D superpixel methods due in part to the added depth data, which may help define object boundaries, while remaining efficient enough to use in real-time applications or online applications. Thus, the present invention preferably makes use of supervoxels, as explained below, but it is to be understood that more typical voxels may be used in place of supervoxels at the cost of increased computing processing requirements.

Various techniques are known for identifying characteristic features in an image that may be used to describe an imaged scene. Characteristic features may include distinguishing shapes or sections-of-an-image or individual points (i.e. pixels or superpixels) of an image. For ease of discussion, the present discussion is described as using feature points (which include individual pixels), with the understanding that other characteristic features (and methods of identifying characteristic features) may also be used without deviating from the present invention.

As an example of how characteristic features may be used, if one has a library of identifying feature points (or descriptors) that describe an object (such as obtained from a collection of training images (i.e. true image samples) of the target object, or object type), then one may search an input test image for those identifying feature points in an effort to determine if an example of the target object is present in the input test image. In the field of computer vision, this idea has been extended to matching common features of a common scene in multiple digital images of the common scene taken from different view angles (i.e. different FOVs) to index (e.g. match or correlate) feature points from one image to another. This permits the combined processing of the multiple digital images.

For example in FIG. 1, images 7A, 7B, 7C and 7D each provide partial, and overlapping, views of a building in a real-world scene, but none provide a full view of the entire building. However, by applying edge detection and indexing (i.e. identifying matching pairs of) feature points in the four partial images 7A, 7B, 7C and 7D that correlate to the same real feature point in the real-world scene, it is possible to stitch together the four partial images (such as by applying an image stitching tool) to create one composite image 7E of the entire building. In the example of FIG. 1, the four partial images 7A, 7B, 7C and 7D are taken from the same view angle (i.e. a single FOV), but this approach may be extended to the field of correspondence matching and applied to images taken from different FOV's.

Correspondence matching refers to the matching of objects or object features (or more typically the matching of feature points, such as individual pixels) common to two or more images. Correspondence matching tries to determine which parts of a first image correspond to (i.e. are matched to) what parts of a second image, assuming that the second image was taken after the camera that took the first image had moved, time had elapsed, and/or the pictured objects had moved. For example, the first image may be of a real-world scene taken from a first view angle, defining a first field-of-view (FOV), and the second image may be of the same real-world scene taken from a second view angle defining a second FOV. Assuming that the first and second FOVs at least partially overlap, correspondence matching refers to the matching of common features points in the overlapped portions of the first and second images.

Thus, correspondence matching is an essential problem in computer vision, especially in stereo vision, view synthesis, and 3D (or perspective) reconstruction. Assuming that a number of image features, or objects, in two images taken from two view angles have been matched, epipolar geometry may then be used to identify the positional relationship between the matched image features to achieve stereo view synthesis, or 3D reconstruction.

Epipolar geometry is basically the geometry of stereo vision. For example in FIG. 2, two cameras 11 and 13 create two 2D images 15 and 17, respectively, of a common 3D scene 10 consisting of a larger sphere 19 and a smaller sphere 21. 2D images 15 and 17 are taken from two distinct view angles 23 and 25. Epipolar geometry describes the geometric relations between points in 3D scene 10 (for example spheres 19 and 21) and their relative projections in 2D images 15 and 17. These geometric relationships lead to constraints between the image points, which are the basis for epipolar constraints, or stereo constraints, described more fully below.

Figure 2:
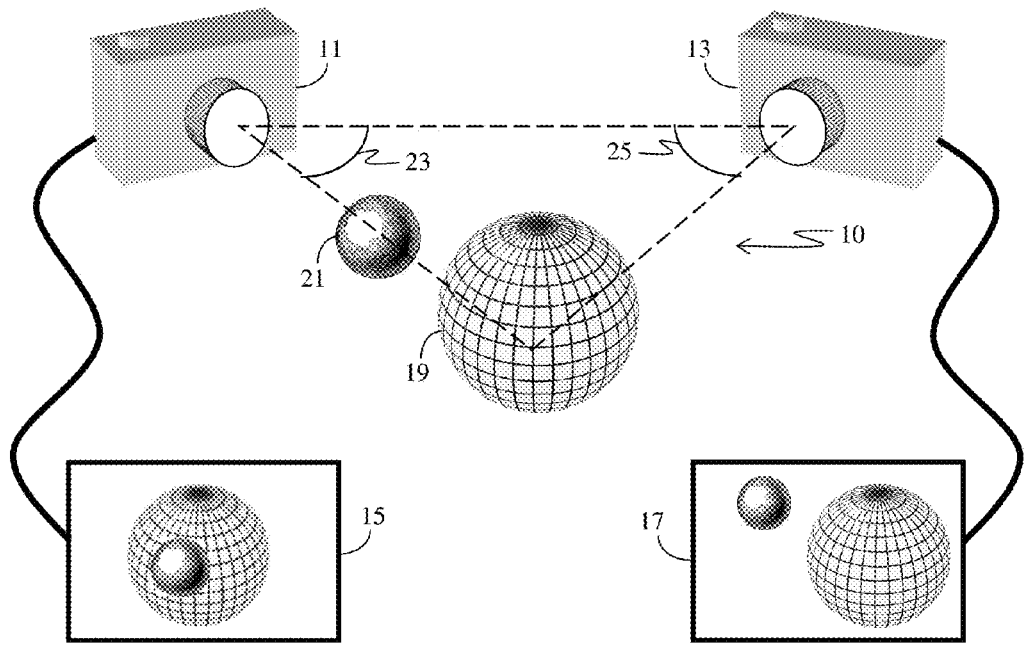
FIG. 2 illustrates the principles of Epipolar geometry.

FIG. 2 illustrates a horizontal parallax where, from the view point of camera 11, smaller sphere 21 appears to be in front of larger sphere 19 (as shown in 2D image 15), but from the view point of camera 13, smaller sphere 21 appears to be some distance to a side of larger sphere 19 (as shown in 2D image 17). Nonetheless, since both 2D images 15 and 17 are of the same 3D scene 10, both are truthful representations of the relative positions of larger sphere 19 and smaller sphere 21. The positional relationships between camera 11, camera 13, smaller sphere 21 and larger sphere 19 thus establish geometric constraints on 2D images 15 and 17 that permit one to reconstruct 3D scene 10 given only 2D images 15 and 17, as long as the epipolar constraints (i.e. stereo constraints) are known.

Figure 3:
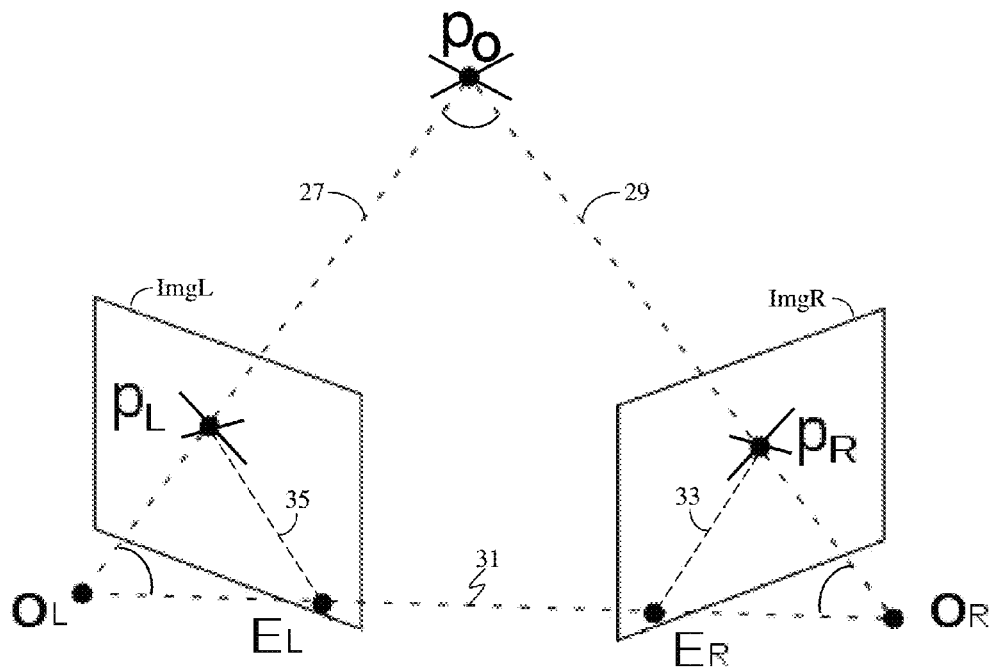
FIG. 3 is an example of defining stereo constraints using Epipolar geometry.

Epipolar geometry is based on the well-known pinhole camera model, a simplified representation of which is shown in FIG. 3. In the pinhole camera model, cameras are represented by a point, such as left point $O_L$ and right point $O_R$, at each respective camera's focal point. Point $P_O$ represents the point of interest (i.e. an object) in the 3D scene being imaged, which in the present example is represented by two crisscrossed lines.

Typically, the image plane (i.e. the plane on which a 2D representation of the imaged 3D scene is captured) is behind a camera's focal point and is inverted. For ease of explanation, and to avoid the complications of a an inverted captured image, two virtual image planes, ImgL and ImgR, are shown in front of their respective focal points, $O_L$ and $O_R$, to illustrate non-inverted representations of captured images. One may think of these virtual image planes as windows through which the 3D scene is being viewed. Point $P_L$ is the 2D projection of point $P_O$ onto left virtual image ImgL, and point $P_R$ is the 2D projection of point $P_O$ onto right virtual image ImgR. This conversion from 3D to 2D may be termed a perspective projection, or image projection, and is described by the pinhole camera model, as it is known in the art. It is common to model this projection operation by rays that emanate from a camera and pass through its focal point. Each modeled emanating ray would correspond to a single point in the captured image. In the present example, these emanating rays are indicated by dotted lines 27 and 29.

Epipolar geometry also defines the constraints relating the positions of each camera relative to each other. This may be done by means of the relative positions of focal points $O_L$ and $O_R$. The focal point of a first camera would project onto a distinct point on the image plane of a second camera, and vise-versa. In the present example, focal point $O_R$ projects onto image point $E_L$ on virtual image plane ImgL, and focal point $O_L$ projects onto image point $E_R$ on virtual image plane ImgR. Image points $E_L$ and $E_R$ are termed epipoles, or epipole points. The epipoles and the focal points they project from lie on a single line, i.e. line 31.

Line 27, from focal point $O_L$ to point $P_O$, is seen as a single point $P_L$ in virtual image plane ImgL, because point $P_O$ is directly in front of focal point $O_L$. This is similar to how in image 15 of FIG. 2, smaller sphere 21 appears to be in front of larger sphere 19. However, from focal point $O_R$, the same line 27 from $O_L$ to point $P_O$ is seen a displacement line 33 from image point $E_R$ to point $P_R$. This is similar to how in image 17 of FIG. 2, smaller sphere 21 appears to be displaced to a side of larger sphere 19. This displacement line 33 may be termed an epipolar line. Conversely from focal point $O_R$, line 29 is seen as a single point $P_R$ in virtual image plane ImgR, but from focal point $O_L$, line 29 is seen as displacement line, or epipolar line, 35 on virtual image plane ImgL.

Epipolar geometry thus forms the basis for triangulation. For example, assuming that the relative translation and rotation of cameras $O_R$ and $O_L$ are known, if projection point $P_L$ on left virtual image plane ImgL is known, then the epipolar line 33 on the right virtual image plane ImgR is known by epipolar geometry. Furthermore, point $P_O$ must projects onto the right virtual image plane ImgR at a point $P_R$ that lies on the same epipolar line 33. Essentially, for each point observed in one image plane, the same point must be observed in another image plane on a known epipolar line. This provides an epipolar constraint that corresponding image points on different image planes must satisfy.

Another epipolar constraint may be defined as follows: if projection points $P_L$ and $P_R$ are known, their corresponding projection lines 27 and 29 are also known. Furthermore, if projection points $P_L$ and $P_R$ correspond to the same 3D point $P_O$, then their projection lines 27 and 29 must intersect precisely at 3D point $P_O$. This means that the three dimensional position of 3D point $P_O$ can be calculated from the 2D coordinates of the two projection points $P_L$ and $P_R$ by triangulation.

Figure 4:
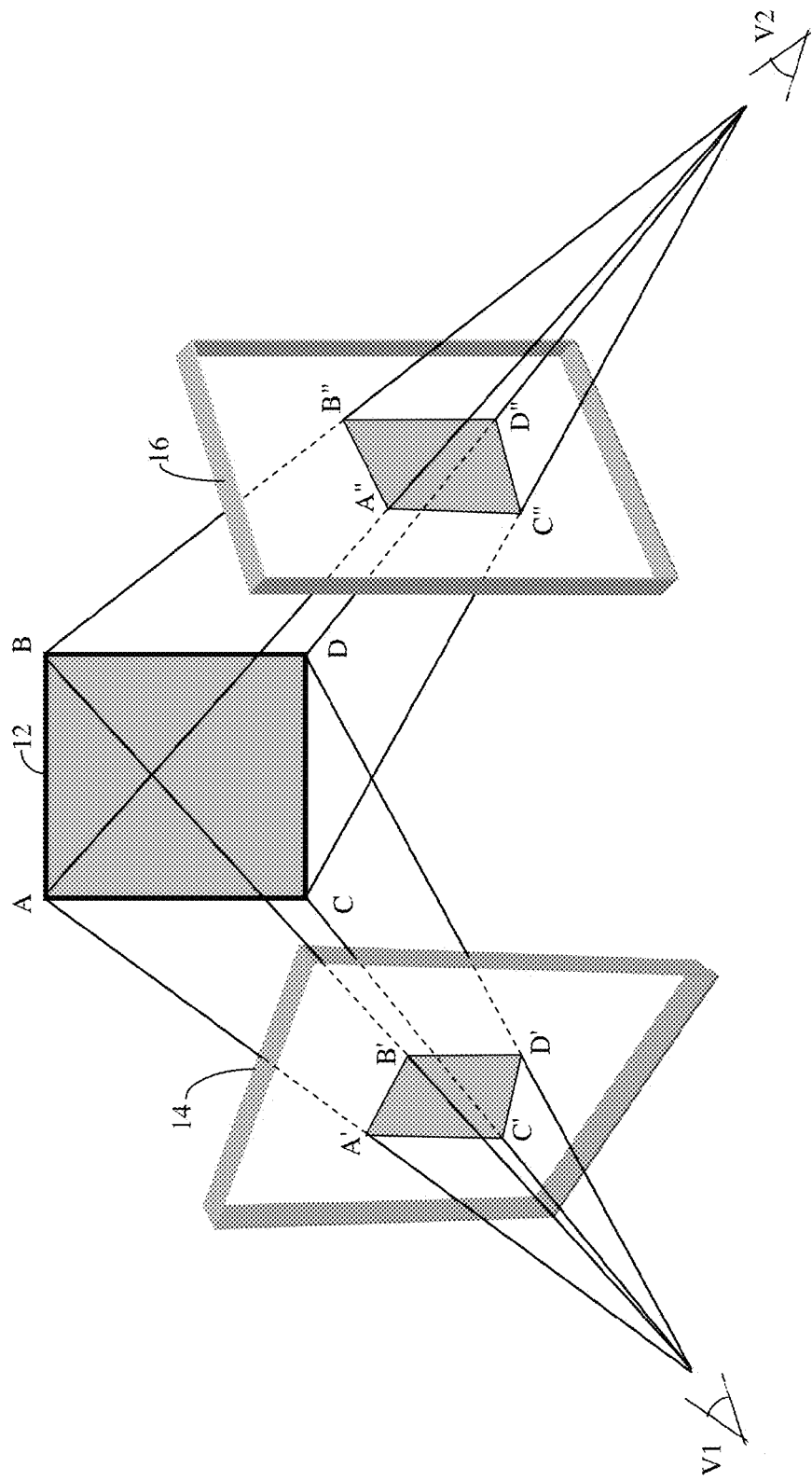
FIG. 4 illustrates the establishment of homography constraints from stereo constraints.

Epipolar geometry also forms the basis for homography, i.e. projective transformation. Homography describes what happens to the perceived positions of observed objects when the point of view of the observer changes. An example of this is illustrated in FIG. 4, where the shape of a square 12 is shown distorted in two image projections 14 and 16 as viewed from two different points of view V1 and V2, respectively. Like before, image planes 14 and 16 may be thought of as windows through which the square 12 is viewed.

Homography would identify the points in common between image projections 14 and 16 and square 12 (i.e. point registration). For example, the four corners A, B, C and D of square 12 correspond respectively to points A', B', C' and D' in image projection 14, and correspond respectively to points A", B", C" and D" in image projection 16. Thus, points A', B', C' and D' in image projection 14 correspond respectively to points A", B", C" and D" in image projection 16.

Assuming that the pinhole model applies, epipolar geometry permits homography to relate any two images of the same planar surface in space, which permits image rectification, image registration, or computation of camera motion (rotation and translation) between two images. Once camera rotation and translation have been extracted from an estimated homography matrix, this information may be used for navigation, or to insert models of 3D objects into an image or video, so that they are rendered with the correct perspective and appear to have been part of the original scene.

Figure 5:
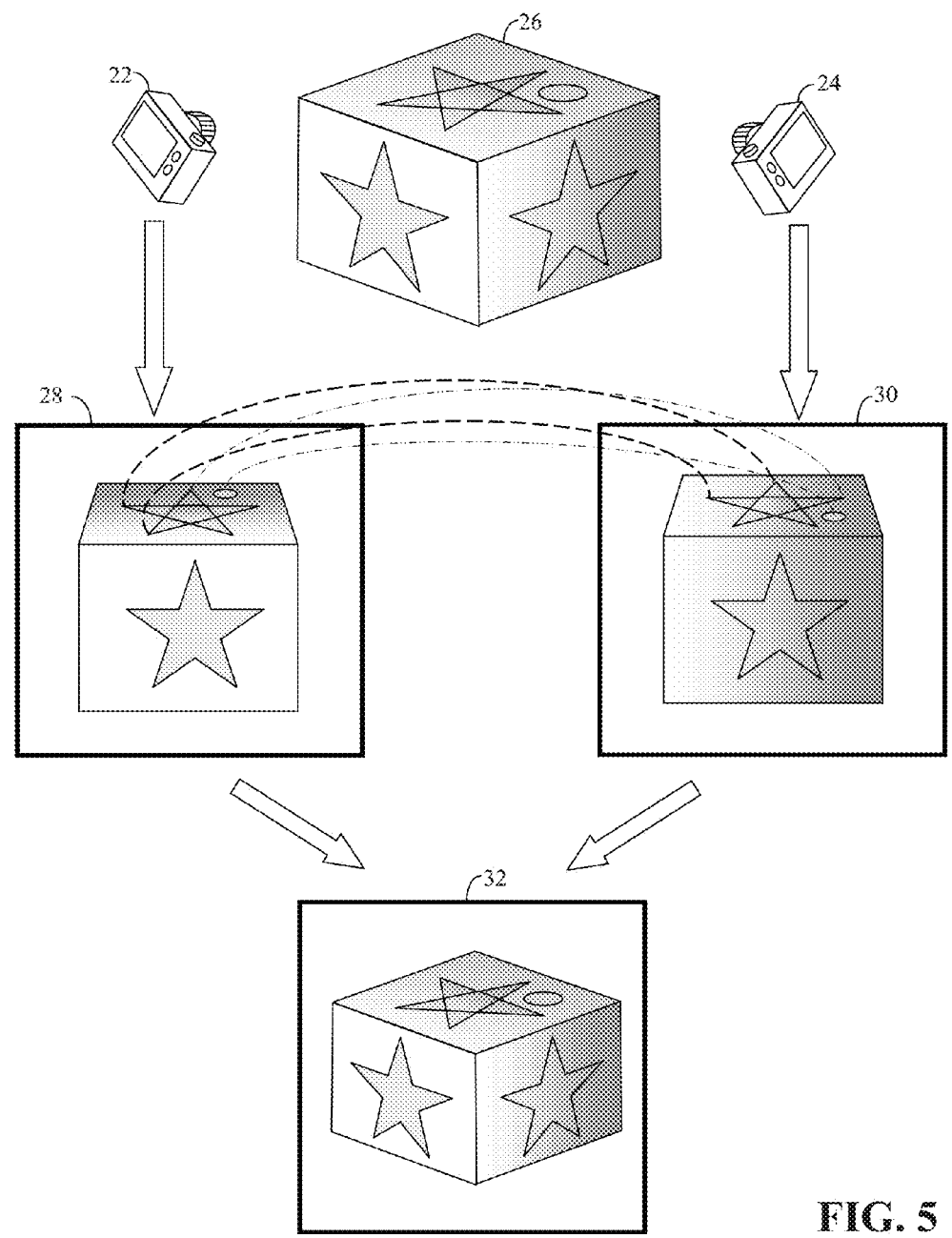
FIG. 5 illustrates homography to re-establish a perspective (i.e. 3D) view from a stereo pair of image, which are images of a common scene but each image has a different field-of-view, i.e. FOV.

For example in FIG. 5, cameras 22 and 24 each take a picture of a 3D scene of a cube 26 from different points of view. From the view point of camera 22, cube 26 looks as shown in 2D image 28, and from the view point of camera 24, cube 26 looks as shown in 2D image 30. Homography permits one to identify correlating points, some of which are shown by dotted lines for illustration purposes. This permits both 2D images 28 and 30 to be stitched together to create a 3D image of cube 26, as shown in image 32. Thus, automatically finding correspondence between pairs of images is the classic problem of stereo vision. Integral to this, however, is the identifying of feature points in the pairs of images, and the matching of corresponding feature points in the pairs of images.

In the above discussion of stereo vision, the constraints related to epipolar geometry and homography may collectively be referred to as perspective constraints, particularly as applied to a stereo image pair.

Because of their use in establishing perspective (3D) information, feature based correspondence matching algorithms have found wide application in computer vision.

Examples of feature based correspondence matching algorithms are the scale-invariant feature transform, SIFT, and the Affine SIFT (or ASIFT). It is noted, however, that feature based correspondence matching algorithms, such as SIFT and Affine SIFT, purposely exclude edge points from their analysis and thus are not well suited for edge detection.

As it is known in the art, the SIFT algorithm scans an image and identifies points of interest, or feature points, which may be individual pixels and describes them sufficiently (typically relative to its neighboring pixels within a surrounding window) so that the same feature point (or pixel) may be individually identified in another image. A discussion of the SIFT transform is provided in U.S. Pat. No. 6,711,293 to Lowe, which is herein incorporated in its entirety by reference. Essentially, SIFT uses a library of training images of a specific object to identify feature points characteristic to that specific object. Once a library of the object's characteristic feature points (e.g. pixels) have been identified, the feature points can be used to determine if an instance of the object is found in a newly received test image. Other examples of feature point extraction are provided in "ORB: an efficient alternative to SIFT or SURF" by Rublee et al. *International Conference on Computer Vision*, 2011.

Principally, feature points (i.e. points of interest) of a desired target object are extracted to provide a "feature description" of the target object. This description, extracted from training images, can then be used to identify the target object in a test image containing many object-types. To perform reliable recognition, it is preferred that the features extracted from the training images be detectable under changes in image scale, noise, illumination, and rotation. Feature points usually lie near high-contrast regions of an image. However, since distortion of an object (such as if a feature points is located in an articulated or flexible parts of the object) may alter a feature point's description relative to its neighboring pixels, changes to an object's internal geometry may introduce errors. To compensate for these errors, feature point detectors, such as SIFT, typically detect and use a large number of feature points so that the effects of errors contributed by these local variations may be reduced.

In a typical SIFT application, feature points of target objects are first extracted from a set of training images and stored in a database. The target object is recognized in a new image (test image) by individually comparing each feature point extracted from the new image with the feature points in this database and finding candidate matching features based on Euclidean distance of their feature point vectors. From the full set of matches, subsets of feature points that agree on the object and its location, scale, and orientation in the new image are identified to filter out good matches. Consistent clusters of good matches are then identified. Typically, each cluster of three or more features that agree on an object and its pose is then subject to further detailed model verification and subsequently outliers are discarded. Finally the probability that a particular set of features indicates the presence of the target object is computed, given the accuracy of fit and number of probable false matches. Object matches that pass all these tests can be identified as correct.

Figure 6:
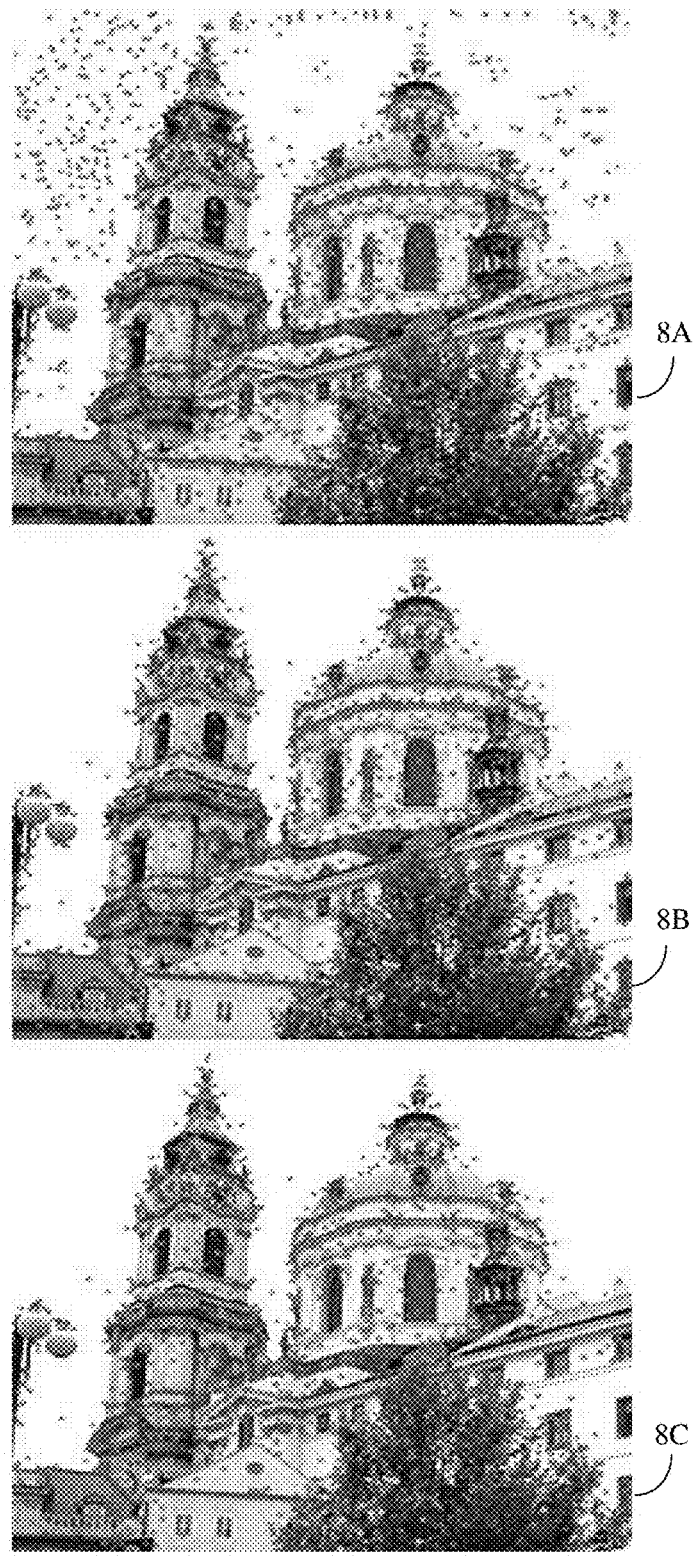
FIG. 6 illustrates feature point extraction from a sample image.

An example of a SIFT determination of feature points in an image is illustrated in FIG. 6. Possible feature points are first identified, as indicated by dark dots in image 8A. Possible feature points that have a low contrast are then discarded, as illustrate in image 8B. Finally, possible features points located on edges are removed, which leaves the final set of feature points shown in image 8C.

Figure 7:
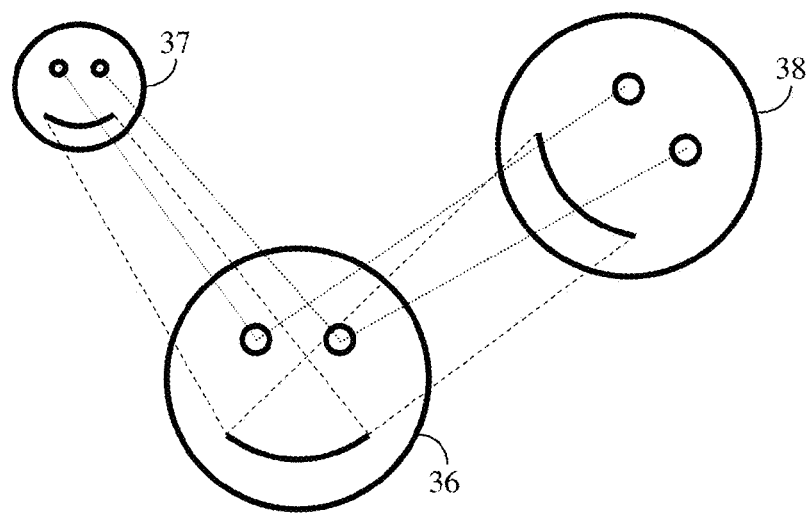
FIG. 7 illustrates the establishment of feature point correspondence using an SIFT transform.

Thus, SIFT permits one to match feature points of an identified object from one image to another. This is illustrated in FIG. 7, where three images of the same object, i.e. a happy face, are shown. For illustration purposes, only four feature points, corresponding to points near the eyes and the corners of the mouth, are shown. As indicated in FIG. 7, SIFT can match feature points from a first face 36 to a second face 37 irrespective of a change in scale and rotation. However, SIFT has been found to have limited immunity to affine transforms of images. That is, SIFT is limited to the amount of change in the view-angle an imaged object can undergo and still be identified.

A method of extending a SIFT transform to better handle affine transformations is described in "ASIFT: A New Framework for Fully Affine Invariant Image Comparison" by Morel et al, SIAM Journal on Imaging Sciences, vol. 2, issue 2, 2009, which is herein incorporated in its entirety by reference.

Figure 8:
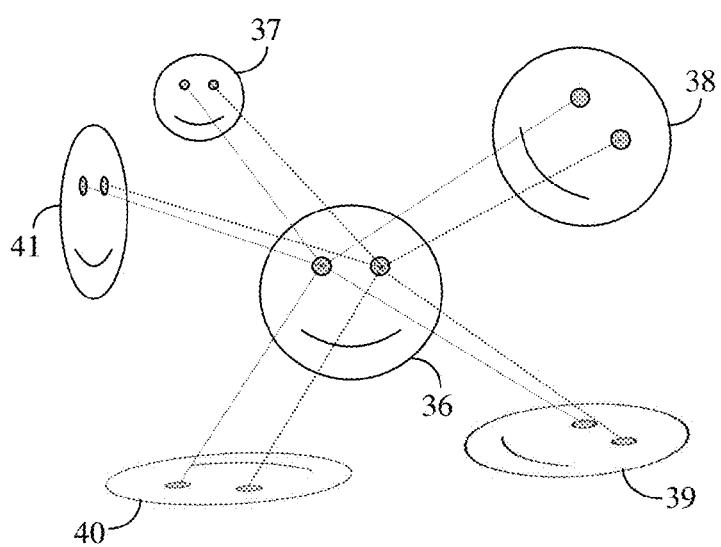
FIG. 8 illustrates the establishment of feature point correspondence using an ASIFT transform.

With reference to FIG. 8, an Affine SIFT would be better able to match feature points from first face 36, to representations of the same object that have undergone affine transformations, as illustrated by happy faces 39, 40, and 41.

Figure 9:
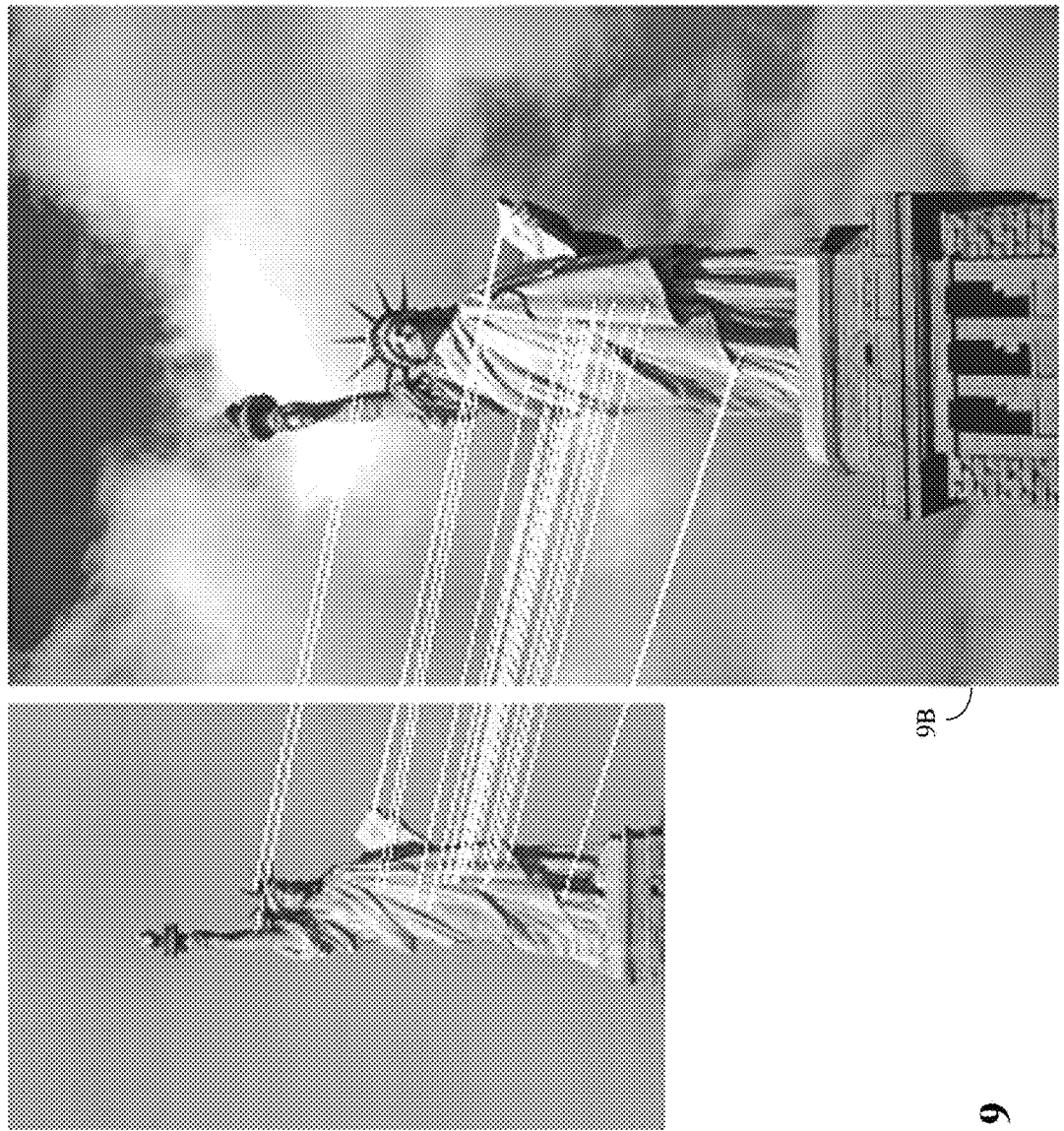
FIG. 9 is an example of feature point correspondence in two images of a common scene, taken from different field-of-views, i.e. FOVs.

An example of an application of an Affine SIFT transform is illustrated in FIG. 9, where multiple feature points are matched from a first image 9A of the Stature of Liberty from a first view angle, to a second image 9B of the Statue of Liberty from a different view angle and at a different scale.

A quick overview of the feature point extraction function of a SIFT filter/algorithm/module/processor is illustrated in FIGS. 10 and 11. FIG. 10 illustrates the extraction of one image point IMG1_FP1 from a sample image IMG1, which is comprised of a plurality of pixels (not shown). Each extracted feature point (such as those illustrated in FIG. 5-9) is described by a series of metrics falling into several categories, i.e. distinguishing characteristics, within a window (an array of pixels, such as represented by Window_1). The center point (or center pixel IMG1_FP1) within a window (Window_1) may be identified as the feature point for that window. If desired, each feature point is assigned an identification code (or label) for quick reference. For example, feature point label IMG1_FP1 may identify the feature point as being feature point number "1" extracted from image "IMG1". As is explained above, a plurality of feature points may be extracted from a plurality of training images in order to gather a collection (library) of features points associated with a specific target object shown in each training image, as well as from a test image to test if an instance of the target object is found in the test image.

The observed metrics of each feature point are preferably arranged into corresponding histograms, and thus multiple histograms are created for each feature window. Consequently, a typical SIFT processing algorithm creates a series (or set) of SIFT histograms 66 for each feature point. Therefore, each set of histograms collectively describes its associated feature point (or SIFT descriptor). Each of the SIFT histograms statistically describes a distinguishing characteristic of the feature point relative to its neighborhood of pixels (or pixel window) surrounding the feature point (or item descriptor or feature pixel) in the image being processed.

The series of SIFT histograms 66 are then collected (or otherwise combined) into single vector 68, which defines one feature point. That is, each vector 68 provides sufficient data to identifying an individual pixel (or feature point) within an image. Therefore, each vector 68 describes a single item descriptor (i.e. a feature point or characteristic feature or feature pixel), such as IMG1_FP1, and typically consists of 128 pieces of descriptive data. Thus, each feature point is characterized (described or identified) by a 128-dimensioned vector 68. For example, each SIFT feature point may be a 128-bit vector (or binary sequence).

FIG. 11 illustrates multiple sets of feature points extracted from n images, where the images are identified as IMG1 through IMGn. Each image is shown to have a set of feature points (illustrated as circles) individually identified. For example, i feature points are extracted from image IMG1, and they are labeled IMG1_FP1 through IMG1_FPi. Similarly, p feature points are extracted from image IMGn, and they are labeled IMGn_FP1 through IMGn_FPp. Each feature point is a 128-dimension vector (i.e. a vector with 128 data cells). The extracted feature points from one image may then be matched to (i.e. compared to find a match with) extracted feature points from other images.

That is, feature points extracted from training images may be used as a training basis to search for other instances of an object in other images (test images). In this case, the extracted feature points are used as training feature point, and typically arranged in a searchable format, such as a hierarchical tree.

This may include labeling (or otherwise identifying) the training item descriptors corresponding to a target object in training images. For example, the feature points (or item descriptors) corresponding to any given sample image (such as feature points IMG1-FP1 to IMG1_FPi from image IMG1) constitutes a set of item descriptors for that image (IMG1) that may be used as a training set to train the SIFT to search another image for an occurrence of the target object based on whether it has a sufficiently similar set of feature points, such as use of recursive K-means application.

For example, all the sets of items descriptors from sample images of a target object may be collected into a composite collection of item descriptors, which is then used to construct a hierarchical tree (or n-dimensioned data space). An example of using a recursive k-means application is illustrated in FIGS. 12-14.

Figure 12:
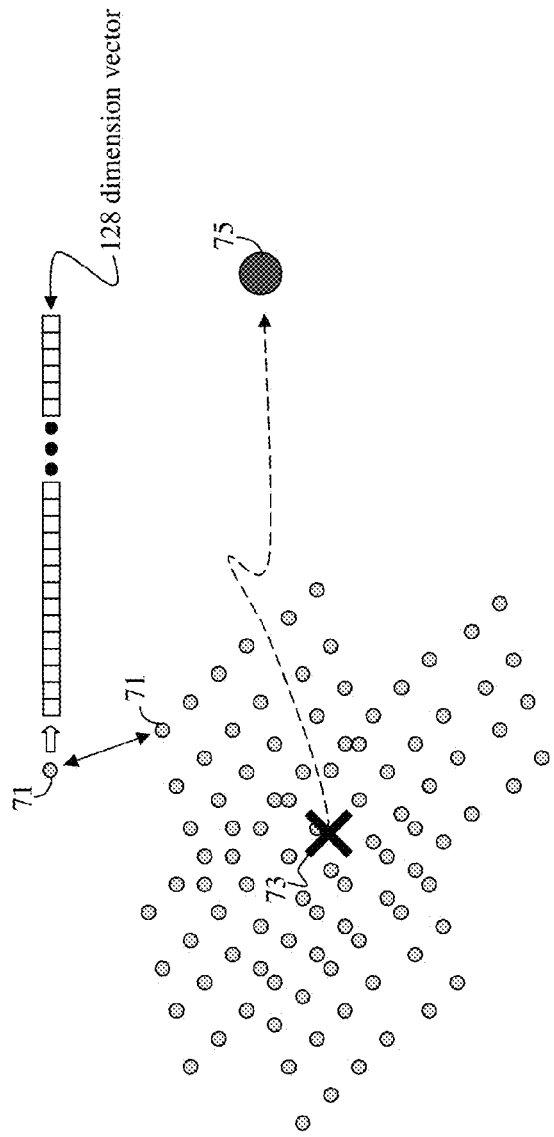
FIGS. 12, 13, and 14 illustrate one method of arranging the information of extracted feature points into a hierarchical tree to ease comparison of feature points between images.

With reference to FIG. 12, although each item descriptor (i.e. feature point), such as point 71, is a 128-dimension vector, for ease of illustration a clustering of lower-dimensioned item descriptors under a single center (preferably the mean value) is shown. This mean value point 73 may define a root node 75 of a hierarchical tree that may be constructed from the clustering of feature descriptors.

Figure 13:
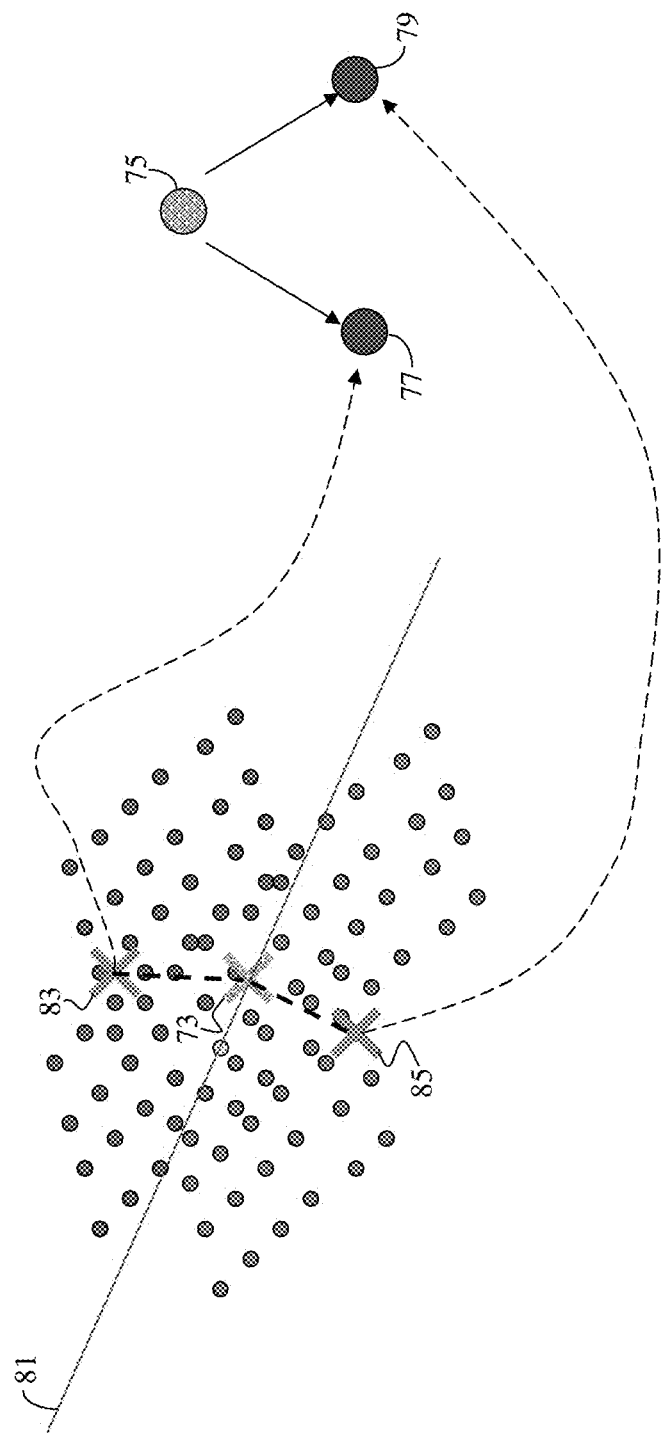

As is illustrated in FIG. 13, the item descriptor data is then split into two groups (for example two substantially equal groups) along mean point 73, as illustrated by dividing line 81. This creates two new center points 83 and 85 in the two newly created groups, respectively. As before, the two new center points 83 and 85 may be defined by the mean of their respective groups of data. Each of center points 83 and 85 may define respective child-nodes 77 and 79 under root node 75.

Figure 14:
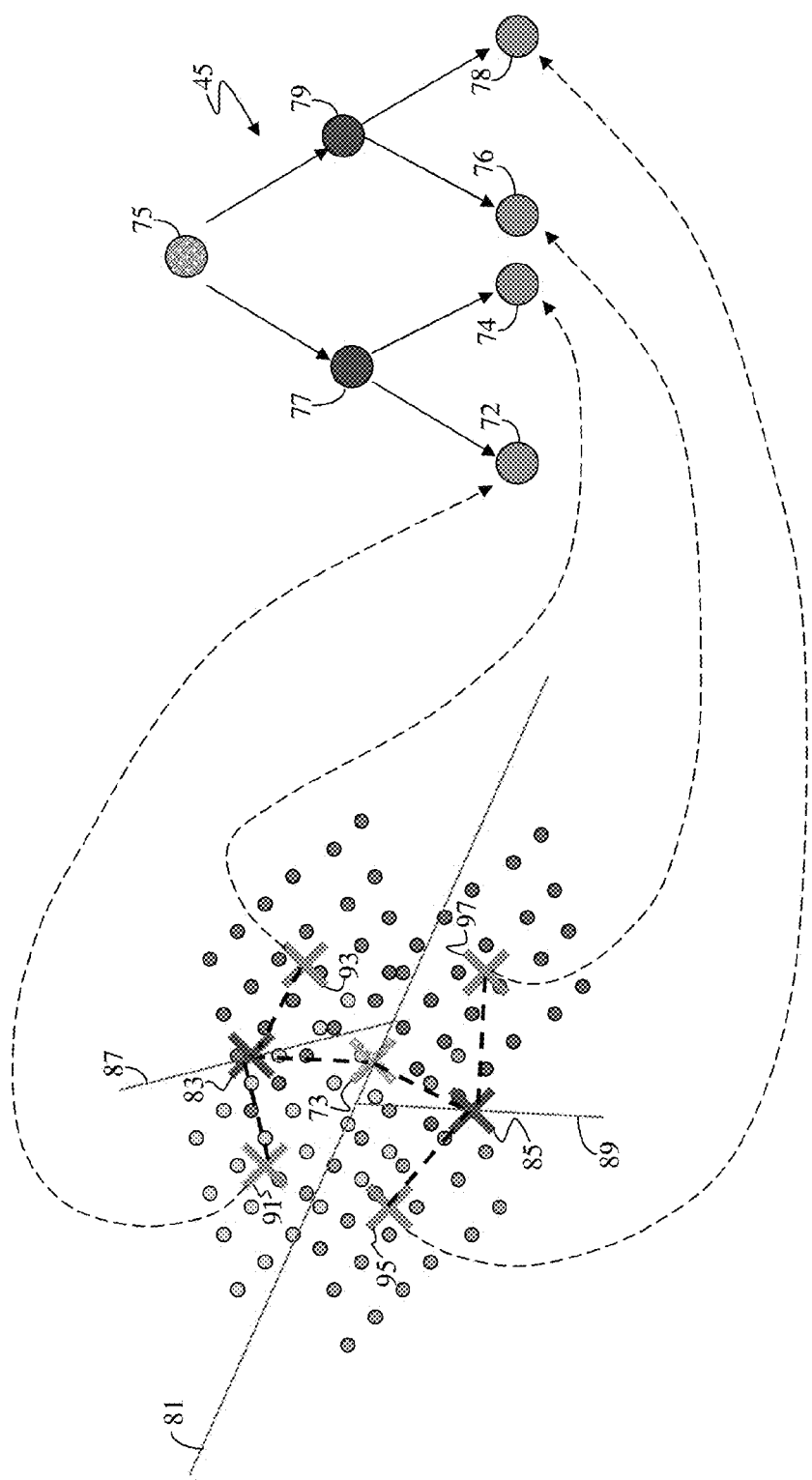

With reference to FIG. 14, each of these two groups may then be divided along their respective center points 83 and 85, as illustrated by dividing lines 87 and 89, respectively. This results in four newly created groups of data, each of which defines a new respective center point 91, 93, 95 and 97. As before, center points 91, 93, 95 and 97 may be defined by the mean of their respective group of data. Center points 91 and 93 may define child-nodes 72 and 74 under node 77 in hierarchical tree 45, and center points 95 and 97 may define child-nodes 76 and 78 under node 79 in hierarchical tree 45. It is to be understood that the data may continue to be divided to define additional child-nodes in simplified hierarchical tree 45. For example, each group of data may continue to be divided until the distance (i.e., the difference) between data within a group is not greater than a predefined maximum.

In a hierarchical tree structure, as it is known in the art, the root node is the top-most node in the hierarchical tree, a parent node is a node that has at least one other node below it and linked to it, a child node is a node linked to a parent node above it, and a leaf node is a node with no child nodes below it. A leaf node is effectively a bottom-most node along a link path (or branch path) downward from the root node. A node along a path downward from the root node to a leaf node may be termed a "path node" or an "intermediate node". Thus, in the example of simplified hierarchal tree 45, node 75 is the root node, nodes 77 and 79 are intermediate nodes (nodes linked to a parent node above them and linked to a child node below them), and nodes 72, 74, 76 and 68 are leaf nodes (nodes linked to a parent node above them, but with no child nodes below them).

When determining if an instance of a sought target object may be found in an input (test) image, feature points are extracted from the input (test) image, such as in a similar manner as described above. These extracted feature points may be termed test feature points. The extracted test feature points may then be compared with sample feature points (training feature points) extracted from training images of the sought target object. One example of how this may be done is if the extracted training feature points are arranged in a hierarchical tree structure as described above, and the extracted test feature points are then distributed into the existing hierarchical tree structure. At each parent node, the distributed test feature point may be compared to the two child nodes below it, and distributed down to the child node closest to the test feature point. This process may continue until the test node is distributed down to a child node. Since the child node has label information indicating the training image from which it was generated, the child node specifies the training image (i.e. target object) associated with it and thus provides a vote of resemblance for that associated target object. By observing the distribution, or the clustering, of test feature points within the hierarchical tree, one may discern if an instance of the sought object is indeed present. This might be done, for example, by measuring the correlation between the test feature points and the training feature points within the hierarchical tree, and/or by a voting method.

Returning to the main topic of the present invention, which is the sensing (or determination/identification) of a target object and its pose information from a 3D model of the target object in a cluttered scene, such as produced by a 3D imaging system. This may be generally termed 3D sensing, or 3D imaging. It is to be understood that any 3D image sensing technology, such as described above, may be used without deviating from the present invention. It is further to be understood that while much of the above discussion focused on 2D images in order to facilitate explanation of some image processing and/or machine vision concepts, these concepts may be expanded to 3D images. Additionally, the present invention focuses on the manipulation of depth information obtained from a depth image, particularly when defined by voxels, or supervoxels. It is further to be understood that the conversion from a 3D point cloud to supervoxels (or voxels) is generally known the art.

As explained above, two fundamental problems of computer vision related applications are object detection and pose estimation, hereinafter collectively referred to as ODPE. In particular, the problems associated with ODPE in a heavily cluttered scene using an intensity-based camera (i.e. an RGB camera) are very challenging due to the difficulty of isolating individual objects in captured images.

Having additional scene information would be helpful in addressing the problems of object detection and pose estimation. In the present embodiment, the additional information used in ODPE is depth information provided by a depth image. Because depth information is not affected by color, contrast, intensity, or other visual factors, it is an ideal solution for detecting objects in clutter. Depth information is further helpful because rough pose estimation using depth data is inherently invariant to object scaling and color contrast. A recent increase in the availability of inexpensive depth sensors (depth imaging devices) further makes depth-based ODPE methods more desirable. The present invention seeks to apply depth-based ODPE methods to heavily cluttered scenarios (scenes) and/or complex objects. One approach to depth-based ODPE would be to first segment a 3D scene into objects (such as by use of an image segmentation tool/method) and then estimate the pose of each segmented object.

Several 3D segmentation methods designed for clean (i.e. not cluttered) 3D scenes are known in the art. One example of a 3D segmentation method for clean scenes is the Euclidean Cluster Extraction method described in "Semantic 3D Object Maps for Everyday Manipulation in Human Living Environments," Tecnische Universitat Muenchen, Munich, Germany, 2009, by R. B. Rusu. Other 3D segmentation methods designed for segmenting simple objects are the Region Growing method (as described in "Segmentation of point clouds using smoothness constraint," International Archives of Photogrammetry, Remote Sensing and Spatial Information Sciences, vol. 36, no. 5, pp. 248-253, 2006, by Rabbani et al.) and the Local Convexity Connected Patch (LCCP) method (as described in "Object Partitioning Using Local Convexity," in CVPR, 2014, by Stein et al.). Such methods, however, fail when the 3D scene is cluttered or when the target object(s) is too complex (i.e. consists of many different and connected parts). This is, at least in part, because an objective of a typical segmentation algorithm/method is to produce a set of non-overlapping segments whose union comprises the entire image, and which ideally includes a complete segmentation of individual objects in the scene. As the objects become more complex (i.e. having many parts, colors, shapes, etc.) it becomes more difficulty to discern which parts belong to the same object. Segmentation of cluttered scenes (and complex objects) is thus very challenging, and it is this challenge that the present invention addresses.

Rather than define a segmentation method that attempts to more accurately segment a 3D scene into individual, non-overlapping, and complete segments of objects, the present invention purposely oversegments the 3D scene (depth data) multiple times. That is, the present approach breaks up a depth image (and its objects) into many, preferably overlapping, over-segmented 3D pieces, such that it is not likely, or expected, that any one 3D piece fully segments a complete object. To do this, in a preferred embodiment, the 3D scene is subjected to multiple applications (runs) of a 3D (over) segmentation process (or routine, or method, or algorithm), each application of the (preferably, but not necessarily, same) 3D segmentation process is given different segmenting criteria and/or different starting seed(s) to assure that each application of the segmentation process results in different, and likely overlapping, over-segmented 3D pieces. Although the (target) object(s) is likely not fully segmented by any individual 3D piece, it is likely that at least part(s) of the target object(s) will be included in some of the 3D pieces because of the many 3D pieces generated by the present over-segmentation approach. Thus, the complexity of the target object (the object being sought) and/or the level of clutter in the scene is not an obstacle since the present approach does not expect to properly segment the target object (or scene) in the first place. Indeed, the more complex the target object is, the more likely it is that at least parts of it will be included in at least some of the many 3D pieces. In the presently preferred embodiment, each 3D piece defines a supervoxel for further processing.

Having over-segmented the 3D scene multiple times into a plurality of supervoxels, the next task is to determine which supervoxels include part(s) of the target object, and how these supervoxels may be joined together (or otherwise combined) to reconstruct the target object. This is not a trivial task since the many supervoxels were defined by different segmenting criteria and/or different segmenting seeds in multiple applications of the segmentation process. The following discussion explains a preferred embodiment for identifying individual supervoxels that may be collected into larger segment patches, and how to collect individual segment patches into composite groups of segment patches that may constitute the target object. Since there is no guarantee that each composite group of segment patches truly segments a target object, each group of segment patches is hereinafter termed a segment hypothesis. Pose information is extracted from the segment hypotheses. This task is further complicated by the objective of achieving this task quickly so that a robot (or other computer controlled machine) can achieve this objective in real-time applications, such as in an assembly line.

The presently preferred embodiment uses machine learning (or training) to help piece together a target object from a plurality of segment patches, each of which has only part of the target object. Because the present invention is preferably implemented in a cluttered scene, it is likely that part(s) of a target object will be obscured, or otherwise not visible. Therefore, the present invention is further capable of discerning the presence of a target object in a cluttered scene even if only part of the target object is visible.

Because training is an important part of the present invention, prior to explaining a preferred implementation of the present invention, it may helpful to first describe a method of preparing a training library for use with the present invention.

Figure 15:
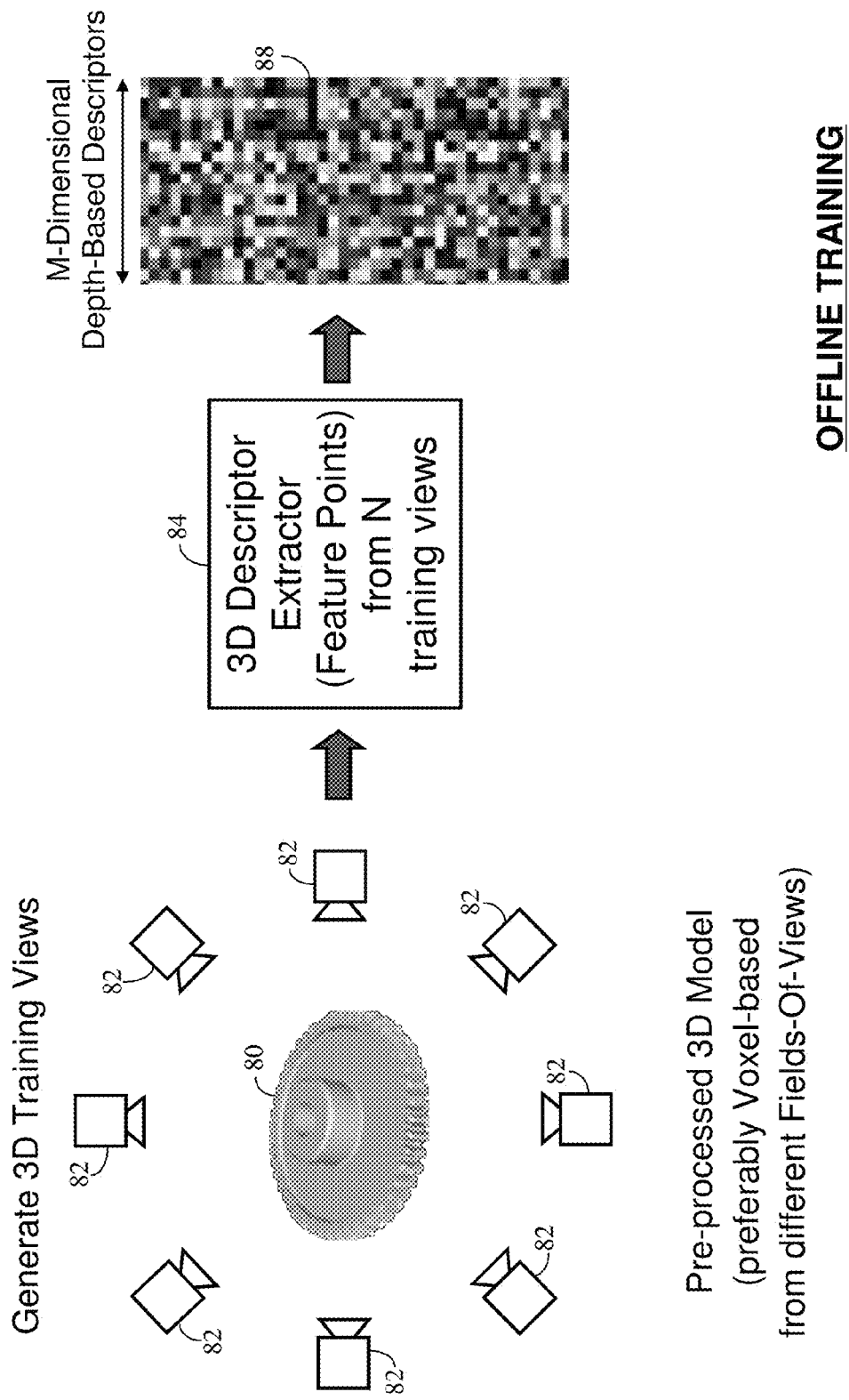
FIG. 15 shows an exemplary system for creating a training library of 3D descriptors of a sample target object.

With reference to FIG. 15, a gear is illustrated as a sample target object 80. A first step is to generate a plurality of 3D training views of the target object 80 from multiple field-of-views (FOVs) with known pose information. This may be accomplished by 3D imaging of the target object 80 using a plurality of depth-capture (imaging) devices 82, as discussed above, or equivalently by rotating the target object 80 to known pose positions while capturing depth images of the target object at each pose position using a single (or reduced number of) depth capture device(s). The target object 80 is then isolated (i.e. extracted) from the background to obtain the training view. Alternatively, if a soft (e.g. digital) 3D model of the device is known, such as a computer aided design (CAD) 3D model, the multiple 3D training views, each with known pose information, may be generated from the soft model without the use of any depth-capture imaging device.

The generated training views are then submitted to a 3D descriptor extractor to extract 3D descriptors (3D feature points). As is explained above, a depth image model (3D model) may be provided in different forms, such as a point cloud or using voxels or supervoxels. 3D descriptors may be extracted from any of those forms. The choice would depend upon which method one wishes to use for object detection and pose estimation. That is, the type of 3D descriptor extraction used on the training views should be the same as that used for 3D descriptor extraction on test images to search for the target object in the test image.

As is explained above, several different methods (techniques) for object detection and pose estimation are known. These different methods may generally be categorized as local, global, voting, or registration methods. Any of these methods may be used without deviating from the present invention, but the presently preferred embodiment uses a global method of ODPE. An example of a suitable global approach to OPDE is provided in "Fast 3D Recognition and Pose Using the Viewpoint Feature Histogram," by Rusu et al., in IROS, 2010, which is herein incorporated in its entirety by reference. To that end, the present 3D training views preferably converts points clouds to supervoxel and, 3D Descriptor Extractor 84 computes global M-dimensional depth-based 3D descriptors for N predefined object views, as illustrated by matrix (or map, or space) 88. Matrix 88 pictorially illustrates the extracted training view descriptors, which are used to identify a target object in a test image and determine its pose. As is explained above, each 3D descriptor (or 3D feature point) may include labels identifying the training view (and target object) from which it was extracted, and its associated pose information.

For completeness, it is noted that an example of a local method of ODPE is provided in "Using spin images for efficient object recognition in cluttered 3D scenes," by Johnson et al., Pattern Analysis and Machine Intelligence, vol. 21, no. 3, pp. 433-449, 1999. Additionally, an example of a voting method of ODPE is provided in "Model Globally, Match locally: Efficient and Robust 3D Object Recognition," by Drost et al., in 2010, CVPR. Lastly, an example of a registration method of ODPE is provided in "An Efficient RANSAC for 3D Object Recognition in Noisy and Occluded Scenes," by Burschka et al., in ACCV, 2011.

Returning to the presently preferred depth-based method of object detection and pose estimation, it is noted that the presently preferred method may be narrowed down to two main parts. The first part is generation of multiple object segmentation hypothesis given a 3D query (i.e. test) depth image, and the second part is application of ODPE (such as the methods mentioned above) constrained (i.e. limited) to each individual segmentation hypothesis extracted from the test depth image. That is, each segmentation hypothesis is used to mask the input (test) depth image, and ODPE is applied only to the masked region defined by the segmentation hypothesis.

As explained above, instead of using one of the standard segmentation algorithms that produce a non-overlapping set of segments whose union comprises the entire image, the presently preferred embodiment generates K (potentially overlapping) segmentation hypotheses, each of which may be comprised of multiple segment patches. This would maximize the likelihood that all objects of interests (target objects) have a high overlap with at least one of the K segments hypotheses.

Figure 16:
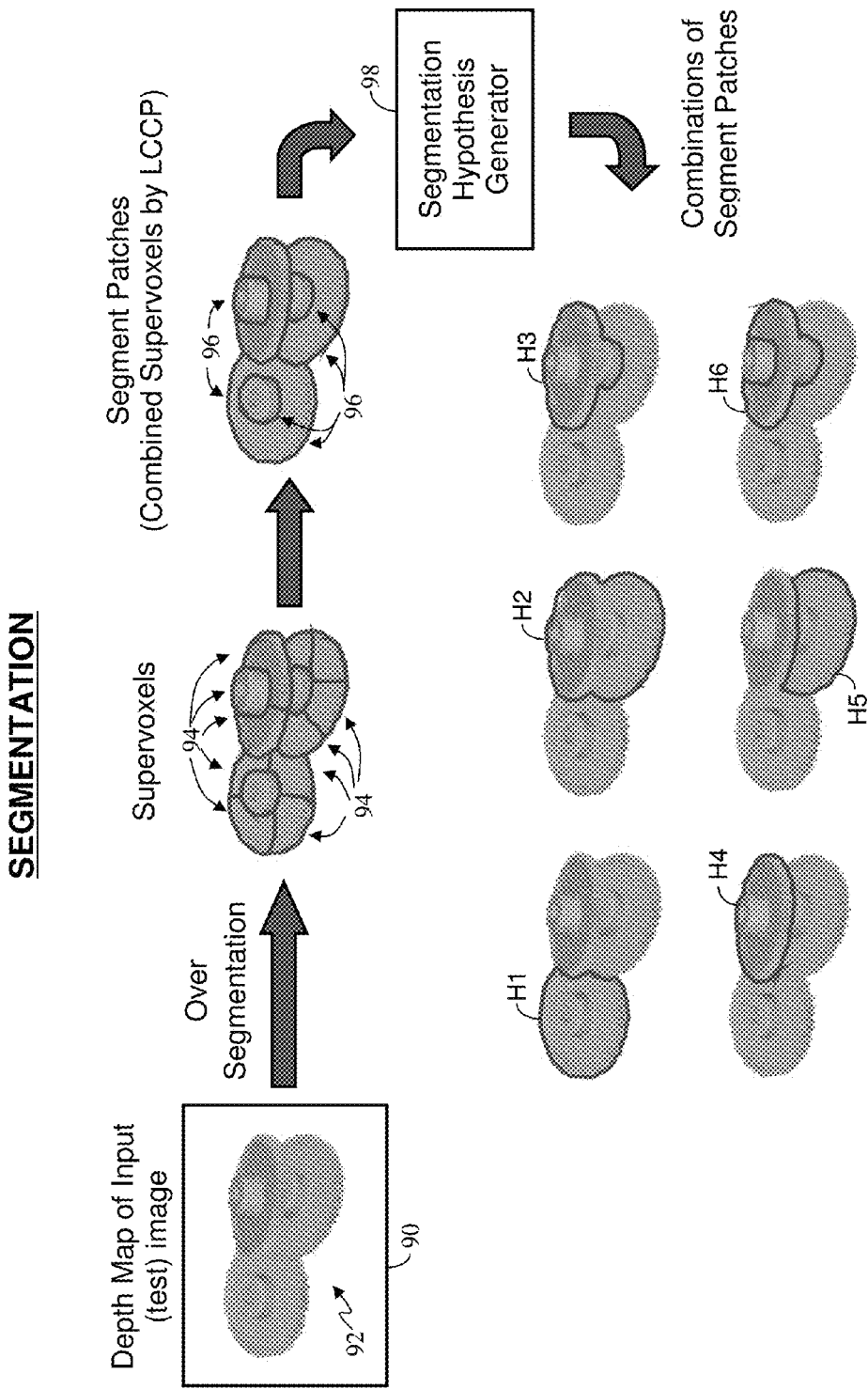
FIG. 16 illustrates a multi-stage segmentation process for generating segment hypotheses of an depth map, input, test image in accord with the present invention.

With reference to FIG. 16, a depth map 92 of an input test image 90 is obtained, or otherwise accessed such as from a memory store. The input test depth map may be obtained by using a depth data capture device, such as the 3D image capture devices discussed above, for example. As illustrated, the input test depth image shows a clutter of objects 92, which may include the target object being sought (for example, training target object 80 of FIG. 15).

The depth map, test image 90 is then submitted to an over-segmentation application that preferably generates supervoxels (larger than typical voxels, or volumetric cloud clusters). As is explained above, the test image 90 is preferably over-segmented to produce overlapping segment pieces 94 (first 3D segments), each of which constitutes a supervoxel 94. For illustration purposes, only a single output set from a single segmentation run is shown, but it is to be understood that depth test image 90 may optionally be submitted to the over-segmentation process multiple times to generate a larger number of supervoxels 94. Preferably supervoxels 94 overlap, and all the resultant supervoxels 94 (either from a single, or from multiple, over-segmentation processes) are collected into a union (not shown).

Optionally, prior to performing supervoxel segmentation, the clutter of objects 92 in depth map (or point cloud) 90 may be subjected to plane segmentation to identify the points within the point cloud that constitute a continuous plane (or plane segment), e.g. that support the well-known plane model. Alternatively, plane segmentation may be incorporated into the supervoxel segmentation process that produces supervoxels 94.

The supervoxel segmentation process that generates segment patches 96 (second 3D segments larger than the first 3D segments) is applied to this union, as a whole, such that (potentially overlapping) supervoxels 94 from different over-segmentation process runs may be combined together.

Various methods for generating multiple segmentations are possible. For example, a specialized/optimized (3D) segmentation process may be run once. Alternatively, a standard (3D) segmentation algorithm (application) can be run multiple times with different parameter setting, region growing methods can be initialized with different sets of seeds, or methods that are specifically designed for multiple hypotheses segmentations can be used. An example of a 3D segmentation algorithm is the Voxel Cloud Connectivity Segmentation (VCCS), which generates volumetric over-segmentations of 3D point cloud data. Preferably, the over-segmentation process is applied multiple times with different segmenting parameters/settings to generate overlapping segment pieces, which may then be combined to create multiple, larger segment patches 96. These larger segment patches 96 may then be combined in multiple combinations to define different segment hypotheses (H1 to H6) (third 3D segments larger than the second 3D segments), each of which preferably includes a large (preferably at least ½) part (or fraction or percent) of a target object.

Although there are various ways to generate multiple segment hypotheses (H1 to H6). The presently preferred method involves generating over-segmented supervoxels 94 first, and then combining these supervoxels 94 to get multiple, larger, segment patches 96. The present segmentation process can be divided into three steps. In the first step, the initial point cloud 92 of the scene 90 is over-segmented into many supervoxels 94. After that, a segmentation method for supervoxels, such as Local Convexity Connected Patch (LCCP), is performed (at least once) to get higher-level segment patches 96 (i.e. larger segments by combining multiple supervoxels 94). Ideally, each segment patch 96 represents a big part of a single object (preferably at least half of the single object, which can be determined from the known volume of the target object). Local Convexity Connected Patch generally determines which 3D segment pieces (or supervoxels 94) to combine based on their adjacency and on how their boundaries (edges) abut each other. For example, the scene may be decomposed into an adjacency-graph of surfaces based on the voxel grid. Edges in the graph are then classified as either convex or concave to each other, and based on these result as well as other criteria a determination is made about whether two segment pieces should be joined.

The final step, illustrated by Segmentation Hypotheses Generator 98, is to generate multiple segmentation hypotheses of the object shapes, which are combinations of connected segment patches 96. If desired additional segmentation hypothesis may be identified by running the Segmentation Hypotheses Generator 98 multiple times, each time providing different criteria and/or starting segment. Criteria for determining which segment patches to combine may include adjacency of a segment patch to a current cluster of segment patches as well as the overall size of the current cluster of segment patch. For illustration purposes, only six segmentation hypotheses H1, H2, H3, H4, H5, and H6 are shown. As illustrated, the segmentation hypotheses H1 to H6 do not necessarily identify a single object. They may identify part of a single object, such as hypotheses H1 and H5, which are partially obscured by other objects. They may also collect/combine parts (i.e. segment patches) of multiple different objects, such as segmentation hypotheses H2, H3 and H6. But they may also identify whole and complete target objects that are not obscured by any other object, such as hypothesis H4.

Since adjacency of segment patches 96 is used as at least one criterion for determining which segment patches 96 to combine to construct segment hypotheses H1-H6, the preferred embodiment makes use of an adjacency matrix of segments. As it is known in the art, an adjacency matrix is a square matrix used to represent a finite graph. The elements of the adjacency matrix indicate whether pairs of vertices are adjacent or not in the graph.

More specifically, to recombine segments (e.g. segment patches 96), the presently preferred embodiment first defines a graph whose vertices are individual segments, and then uses the graph to construct an adjacency matrix among all the segments (e.g. segment patches 96). The adjacency matrix is used to identify nodes for consideration when grouping segments (e.g. segment patches 96). The criterion of connection between two segment patches 96 is a minimum Euclidean distance d between them in 3D space, though more advanced criteria could be used. If the distance d between two segment patches 96 (or equivalently, two point clouds) is not greater than a threshold distance t, then these segment patches 96 are connected in the adjacency matrix.

Figure 17:
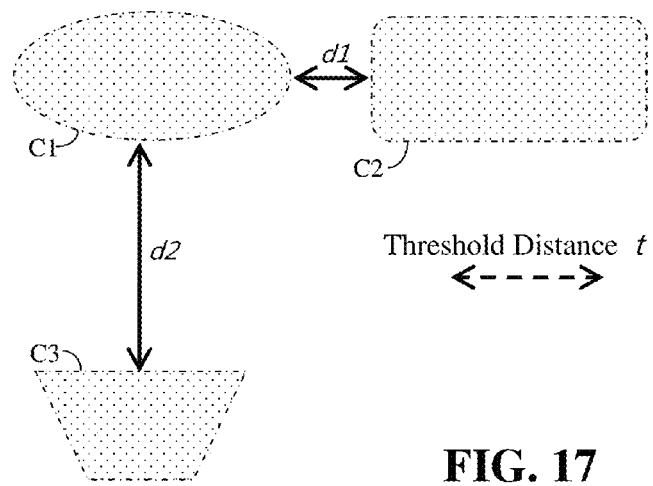
FIG. 17 illustrates one method of determining which 3D segment are classified as being adjacent, or merged together.

For example, FIG. 17 illustrates three point clouds C1, C2 and C3 represent different segment patches 96. The minimum Euclidean distance between C1 and C2 is identified as d1, and the minimum Euclidean distance between C1 and C3 is identified as d2. Also shown is a threshold distance t used to determine whether two adjacent segment patches should be joined. As shown, the minimum Euclidean d1 distance between C1 and C2 is less than threshold distance t, and so C1 and C2 are connected in the adjacency matrix. However, the minimum Euclidian distance d2 between C1 and C3 is greater than t, and so C1 and C3 are not connected in the adjacency matrix.

Remembering that the present segmentation procedure produces multiple overlapping segments from different runs of a segmentation algorithm, and that the combining of supervoxels into segment patches, and the combining of segment patches into segment hypotheses is applied to the all (including overlapping) segments as a unit, the present adjacency procedure identifies a large number of hypotheses segments making use of segments combined from different runs of the segmentation algorithm.

With the adjacency matrix thus constructed, the Segmentation Hypothesis Generator 98 exhausts all the combinations of segment patches 96 that may correspond to individual objects. The system starts from a random segment patch 96, and merges one of its neighbor segment patches 96. If the resultant merged point cloud is within a predefined size S range (3D size range from a lower limit $S_{lower}$ to an upper limit $S_{upper}$) and meets some specific requirement, such as location or shape criterion, the system adds this merged point cloud as a valid segment hypothesis to the output list. The Segmentation Hypothesis Generator 98 will accept the current combination as a valid segment hypothesis and keep merging additional neighboring segments to define additional segment hypotheses until the combined point cloud reaches a size that violates the size constraints. In other words, the system is performing a depth first search of patch graph. When an already existing combination of point cloud (segment patches) is encountered, the corresponding subtree is removed from further consideration. This way, the system exhausts all the combinations that meet the shape criteria.

Figure 18:
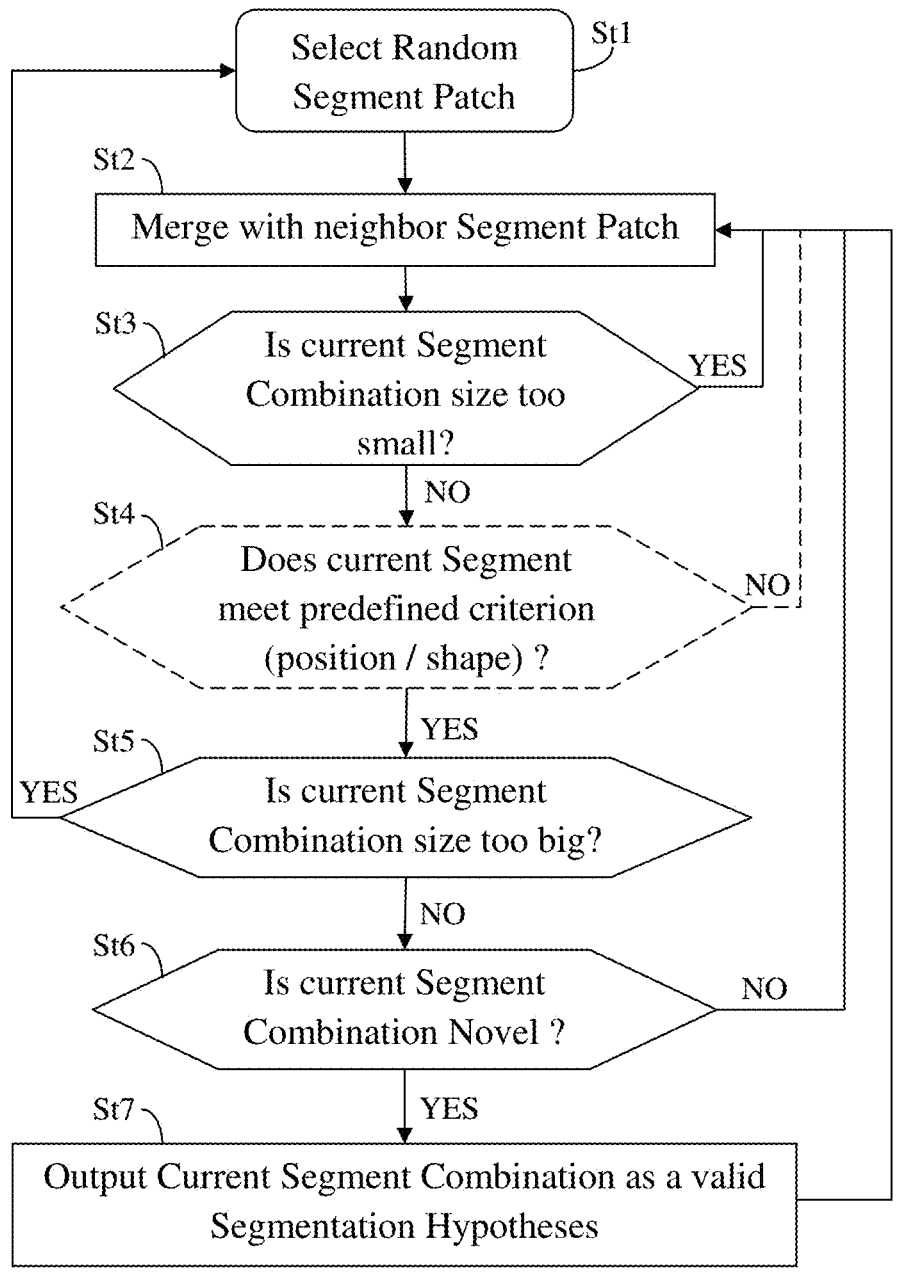
FIG. 18 provides a general overview of a method of generating segment hypotheses.

A simplified implementation of this process is illustrated in flow chart 101 of FIG. 18. The process begins with selection of a random segment patch (St1). The present process assumes that the size limit is determined by counting the number of combined segment patches, rather than calculating a specific volume per segment patch, but this is a design choice. The present example further assumes that the lower limit size, $S_{lower}$, is greater than one segment patch. In a preferred embodiment, the lower limit size $S_{lower}$ is two segment patches. Since the lower limit $S_{lower}$ is greater than one segment patch, after selecting a random patch in step St1, one can immediately proceed to step St2 and merge the selected random segment patch (i.e. the current segment combination) with a neighboring segment patch, as determined from the adjacency matrix.

After merging, the next step St3 is to determine if the current segment patch combination is smaller than the lower limit size, $S_{lower}$. If the current combination is smaller than $S_{lower}$ (St3=YES), then the process returns to step St2 to add an additional neighboring segment patch to the current combination of segment patches. If the current combination of segment patches is not smaller than $S_{lower}$, then the process follows to optional step St4 or step St5. Optional step St4 determines if the current combination of segments meets additional criteria, such as position and/or shape constraints. If the current combination does not meet the optional criterion (St4=NO), then the process returns to step ST2 to add an additional segment. Alternatively, if the current combination does meet the optional criterion (St4=YES), or if the optional step ST4 is omitted, then the process proceed to step ST5.

Since the current combination has been deemed acceptable, step St5 now determines if the current combination is not greater than the upper size limit $S_{upper}$, which is preferably set to four segment patches. If the current combination is too big (St5=YES), such as if the current combination combines more than four segment patches, then the process returns to the first step St1 to discard the current patch combination and select a new random starting patch. However, if the current combination is not too big (St5=NO), then the process proceed to step ST6 to determine if the current combination is novel (i.e. has not been previously identified as a valid segment hypothesis). If step ST6 determines that the current valid combination is not valid, then the process returns to step ST2 to add another segment patch to the current combination. However, if the current combination is valid (ST6=YES), then the current combination is issued (i.e. identified or outputted) as a valid segment hypothesis (such as H1 to H6 illustrated in FIG. 16) and the process returns to step ST2 to add another segment patch to the current combination.

Figure 19:
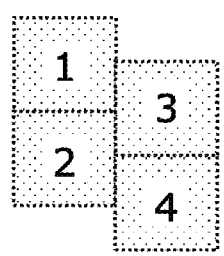
FIG. 19 illustrates four adjacent 3D segment patches.
Figure 20:
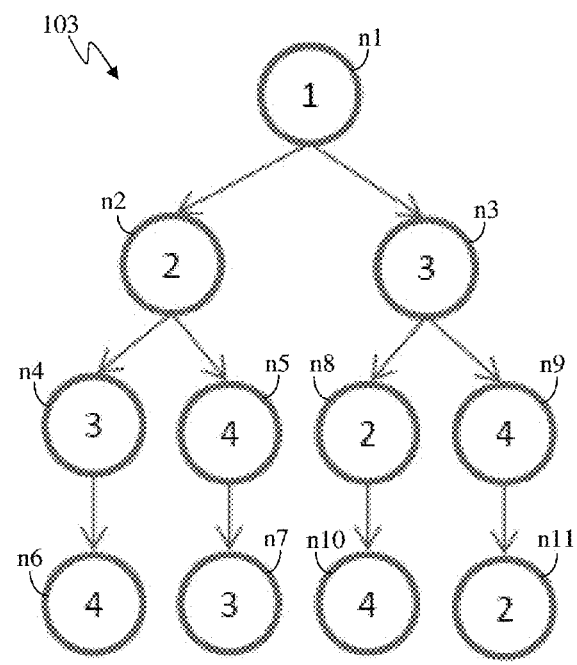
FIG. 20 illustrates a search tree constructed from the four adjacent 3D segments of FIG. 19.

FIGS. 19-21 illustrate a simplified application of the a preferred process for generating valid segments hypotheses. FIG. 19 shows four segment patches (i.e. point cloud clusters) 1, 2, 3, and 4 identified as neighboring segment patches by the adjacency matrix. FIG. 20 illustrates a search tree 103 of neighboring segment patches as generated from the four segment patches (or equally from the adjacency matrix), and FIG. 21 shows a table illustrating various steps in the present process and valid segment hypotheses output (generated) by the present process.

The present example assumes that segment patch 1 of FIG. 19 is selected randomly as the starting patch. Therefore, search tree of FIG. 19 shows segment patch 1 as the top-most node n1, i.e. the root node. Although search tree may be constructed prior to searching for valid combinations, for each of explanation the construction of search tree 103 is discussed along with corresponding steps in table 105 of FIG. 21. Also for ease of explanation, the size of a segment patch combination is used as the only criterion for identifying valid combinations. That is, a segment patch combination is deemed valid (i.e. output, or issued or set, as valid) if the size of the combination is within the size range defined by $S_{lower}$ and $S_{upper}$. In the present example, it is assumed that the size of any two or three patches is within the acceptable size range (between $S_{lower}$ and $S_{upper}$), while the size of a single patch is too small and the size of four patches exceed the size constraints. It is to be understood that size limits unrelated to the number of combined segment patches may also be used. Following the present example, table 105 shows that the first step determines that segment patch 1 is too small and thus not valid, and does not output any segment hypothesis. The process then returns to combine segment patch with an adjacent segment patch.

Starting at segment patch 1 of FIG. 19, the only segment patches adjacent to segment patch 1 are segment patches 2 and 3. Thus, search tree 103 shows two child nodes, n2 and n3, below node n1, where child node n2 correspond to segment patch 2 and node n3 corresponds to segment patch 3. Assuming an initial search path down the branch defined by node n2, table 105 shows that the second step tests the size of the combination of segment patches 1 and 2. Since this combination is deemed valid and novel, the second step of table 105 issues this combination as a valid segment hypothesis.

Returning to FIG. 19, the only segment patches adjacent to the combination of patches 1 and 2 are segment patches 3 and 4. Thus, search tree 103 shows to child nodes, n4 and n5, below node n2, where node n4 corresponds to segment patch 3 and node n5 corresponds to segment patch 4. Table 105 proceeds down the search tree branch along node n4, i.e. adding segment patch 3 to the current combination. This results in a combination of three segment patches, 1, 2, and 3, which is within the valid size range and, since this combination is novel, it is output as a valid segment hypothesis.

Returning to FIG. 19 and continuing with this combination of segment patches 1, 2, and 3, the only adjacent segment patch is segment patch 4. Thus, search tree 103 shows only one child node, n6, below node n4. Since node 4 is a leaf node, it is the end of the current tree branch. In table 105, the fourth step determines that the current combination of segment patches 1, 2, 3, and 4 is too big and thus end its search down this branch path and does not issue any new segment hypothesis.

At this point, a new random starting segment patch could be selected since eventually all valid combinations would be search, but for ease of explanation, the presently preferred process follows the search tree 103. Thus, the present process returns up the current branch of search tree 103 to the first fork not previously explored. This corresponds to node n2, and the only path not previously explored follows to node n5, which adds segment patch 4 to the combination of node n2 (i.e. segment patches 1 and 2). The fifth step in table 105 thus checks the validity of a combination of segment patches 1, 2, and 4. This combination is deemed valid and novel (not previously outputted) and is thus output as a valid segment hypothesis.

As illustrated in FIG. 19, the only segment patch adjacent to the combination of segment patches 1, 2, and 4 is segment patch 3. Thus, search tree 103 shows only one node n7 below node n5, where node n7 corresponds to segment patch 3. The sixth step in table 105 then checks if the combination of segment patches 1, 2, 4 and 3 is valid, but since this combination is not novel (it was previously checked in the fourth step), this search path is stopped and no new segment hypothesis is issued.

Returning back up search tree 103 for a fork not previously search brings us back to root node n1, and its child node n3, which corresponds to segment patch 3. As seen in the seventh step of table 105, the combination of segment patches 1 and 3 is valid and novel, and thus is output as a valid segment hypothesis.

FIG. 19 shows that only segment patches 2 and 4 are adjacent to the combination of segment patches 1 and 3. Thus, search tree 103 shows only two child nodes n8 and n9 below node n3, where node n8 corresponds to segment patch 2 and node n9 corresponds to segment patch 4. Following the branch of node n8, table 105 indicates that this combination is not novel since it was previously examined in the third step, and processing along this path is stopped and no new segment hypothesis is issued. Consequently, node n10 which corresponds to segment patch 4, which is adjacent the combination of segment patches 1, 3, and 2, is not examined for validity since it can be assumed that this combination would also have been previously examined. Indeed, this combination was seen in the fourth step of table 105.

Returning up along this branch of search tree 103 to the first fork not previously explored brings us to node n3. Below node n3, the only path not previously explored follows a branch defined by node n9, which adds segment patch 4 to a combination of segment patches 1 and 3. The ninth step in table 105 thus checks the validity of this combination. Since this combination is novel and within the proper size limits, it is deemed valid and output as a valid segment hypothesis.

Following the branch defined by node n9, the only remaining node is n11, which adds segment patch 2 to the current combination of segment patches 1, 3, and 4. As table 105 shows, this combination of segment patches 1, 3, 4 and 2 is not novel (it was examined in the fourth step), and thus this branch is stopped and not new segment hypothesis is issued.

At this point, the search tree has been exhausted and the search for valid segment hypotheses has ended. The "Output" column of table 105 maintains a running list of valid segment hypothesis at teach step.

Figure 22:
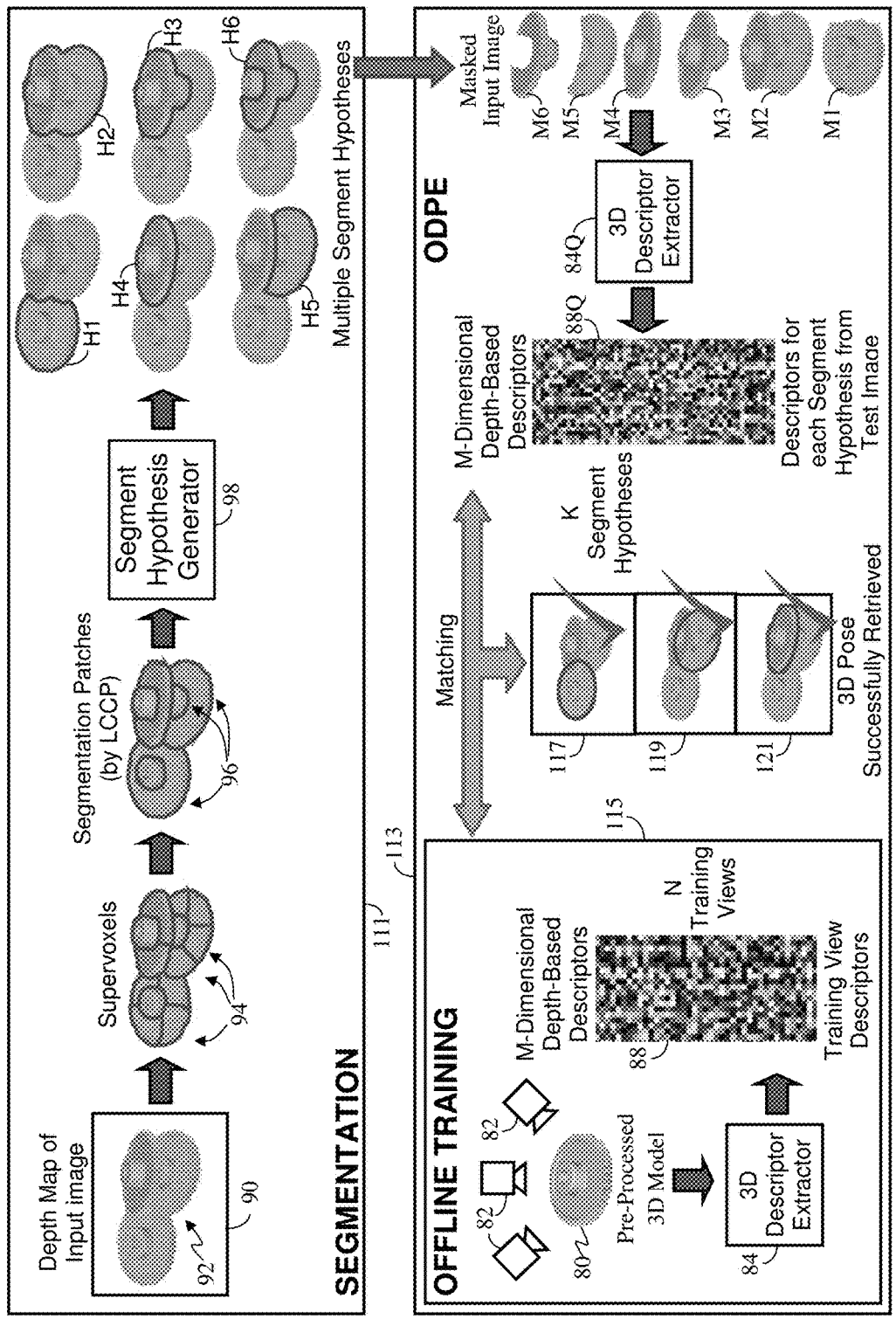
FIG. 22 in an overview of the present system for object detection and pose estimation.

With a list of segment hypotheses thus created, the next step is to submit each segment hypotheses to an object detection and pose estimation (ODPE) module/circuit/computer process/algorithm. FIG. 22 provides an overview of the present ODPE system showing the interaction of several of the above-described components. All elements similar to previously described components have similar reference characters and are described above. For example, FIG. 22 shows that the present ODPE is composed of two main components, a segmentation (circuit) block 111 and an ODPE (circuit) block 113. In the present system, the training module 115, which generates a library of training view descriptors 88 of to identify a target object 80 is considered part of the ODPE block 113.

As is explained above, different approaches (techniques/algorithms) can be used for ODPE, but the presently preferred embodiment employs a global approach, such as described in "Fast 3D Recognition and Pose Using the Viewpoint Feature Histogram," by Rusu et al. in IROS, 2010. To that end, at training time (as illustrated by offline training module 115) global M-dimensional depth-based descriptors 88 are computed for N predefined object views of a target object 80. Each descriptor compactly encodes the appearance of the target object 80 from a particular view. As explained above, each of the M-dimensional depth-based descriptors may be comprised of a plurality of characteristics that together help to uniquely identify the 3D target object from a particular view (e.g. FOV, or view angle).

In operation (i.e. at query time when it is desired to search a 3D input query (or test) image to determine if an example of the target object can be found in the query image), the input test image is submitted to a segmentation module (or computing block/circuit) 111 to implement the above described segmentation process. This results in the generation of multiple segment hypotheses, any of which may contain at least a part of the target object. Each of the segmentation hypotheses is then used to mask the query depth image 90 and thus provide partial (i.e. masked) views of query 3D point cloud 92, as illustrated by masked portions M1 to M6, which correspond to segment hypotheses H1 to H6, respectively. The masked portions M1 to M6 are then submitted to query 3D descriptor extractor 84Q (preferably of the type (i.e. global descriptors) as 3D Descriptor Extractor 84 used to extract training library 88). Although only six segment hypotheses are shown, it is to be understood that a much greater number K of segment hypotheses are preferably defined. Thus, global descriptors are computed for the masked portions M1 to M6 of the depth image 92, which results in a query library 88Q of M-dimensional depth-based descriptors for the K segment hypotheses. The descriptors of query library 88Q are then matched to training view library 88 to identify descriptors in each library that match (or are substantially similar to each other). As explained above, the present embodiment uses a global approach to matching, but other matching methods may also be used. For example, as explained above, matching may be done by a k-means approach, voting, etc. For example, after the query descriptor(s) of a masked portion is distributed to the leaf nodes space of the training descriptors, a determination can be made of whether leaf nodes associated with a particular training view of the target object received a statistically significant (i.e. greater than twice the next greatest) portion of the query descriptor(s).

If a sufficient match is found for any masked portion, it is correlated to the target object corresponding to the matched training view. In this manner the target object and known pose information are attributed to the masked portion. As illustrated by output results 117, 119, and 121, the present invention permits each individual target object, and its pose information, in the cluttered scene to be successfully, and separately, identified.

Figure 23:
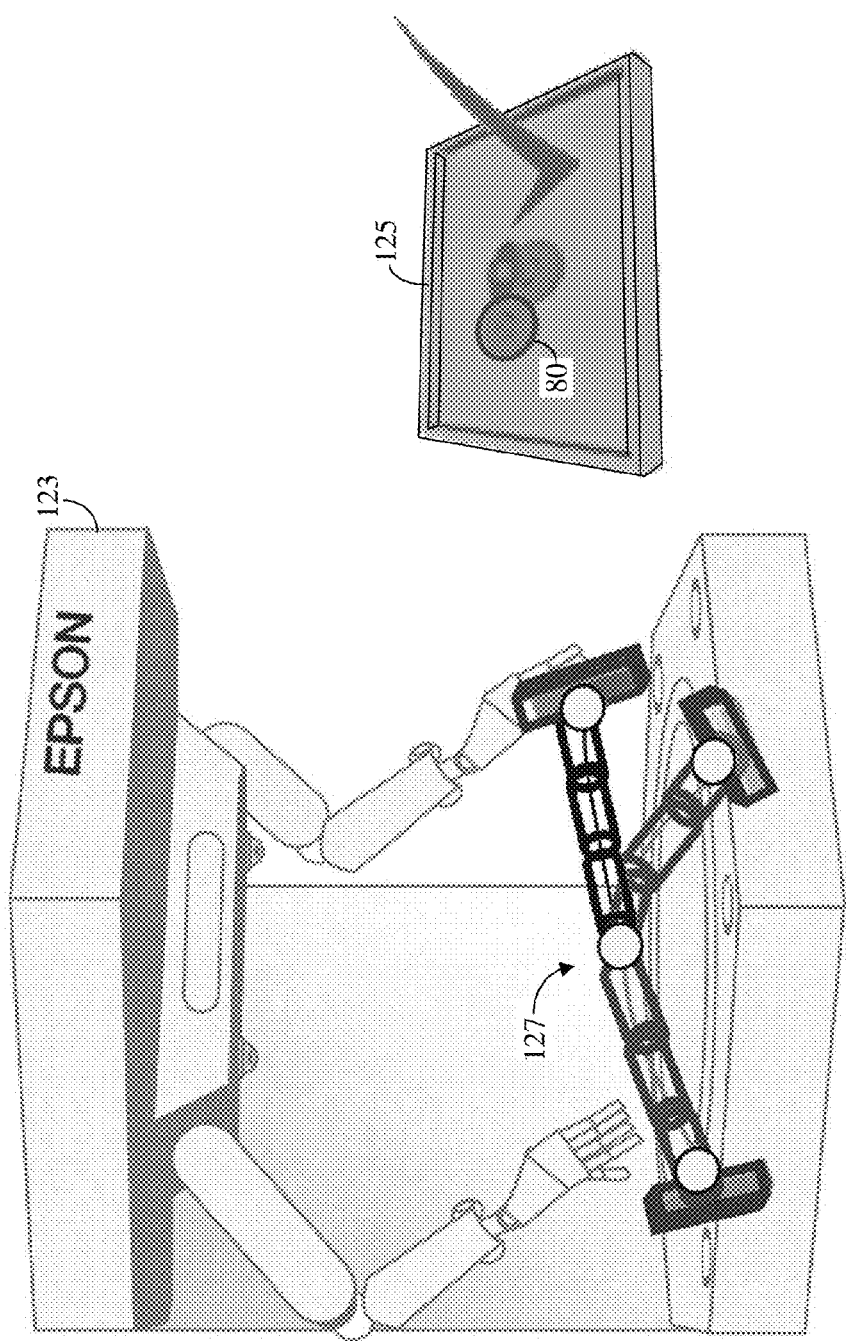
FIG. 23 illustrates a robot using the present machine vision system to identify and grasp a target object from a cluttered bin of object in an assembly line.

With reference to FIG. 23, an example application of the present invention show a robot 123 using the present embodiment to pick a target object 80 among a cluster of objects from a bin 125, where objects are cluttered inside the bin and individual object detection and pose estimation is difficult using only traditional intensity-based cameras (RGB camera) with no depth information. By contrast, the present robot 123 is able to identify the target object 80 individually (including from among a clutter of different types of objects) in real time and grasp the target object 80 for attachment onto an assembly 127 (i.e. a structure being assembled).

Alternatively, according to another embodiment, the present invention may be integrated into to an AR (Augmented Reality) and/or VR (Virtual Reality) system in which an object, such as a three dimensional computer graphics object, is rendered or displayed on a display device in response to the derived position and pose orientation of the target object. The present invention could be used to identify pose information of an image object, and to match the imaged object to a library of objects. The AR and/or VR system may include display devices such as an optical see-through or video see-through head-mounted display device and a head-up display device." The AR and/or VR system may further be incorporate into a head-mounted display (HMD).

Figure 24:
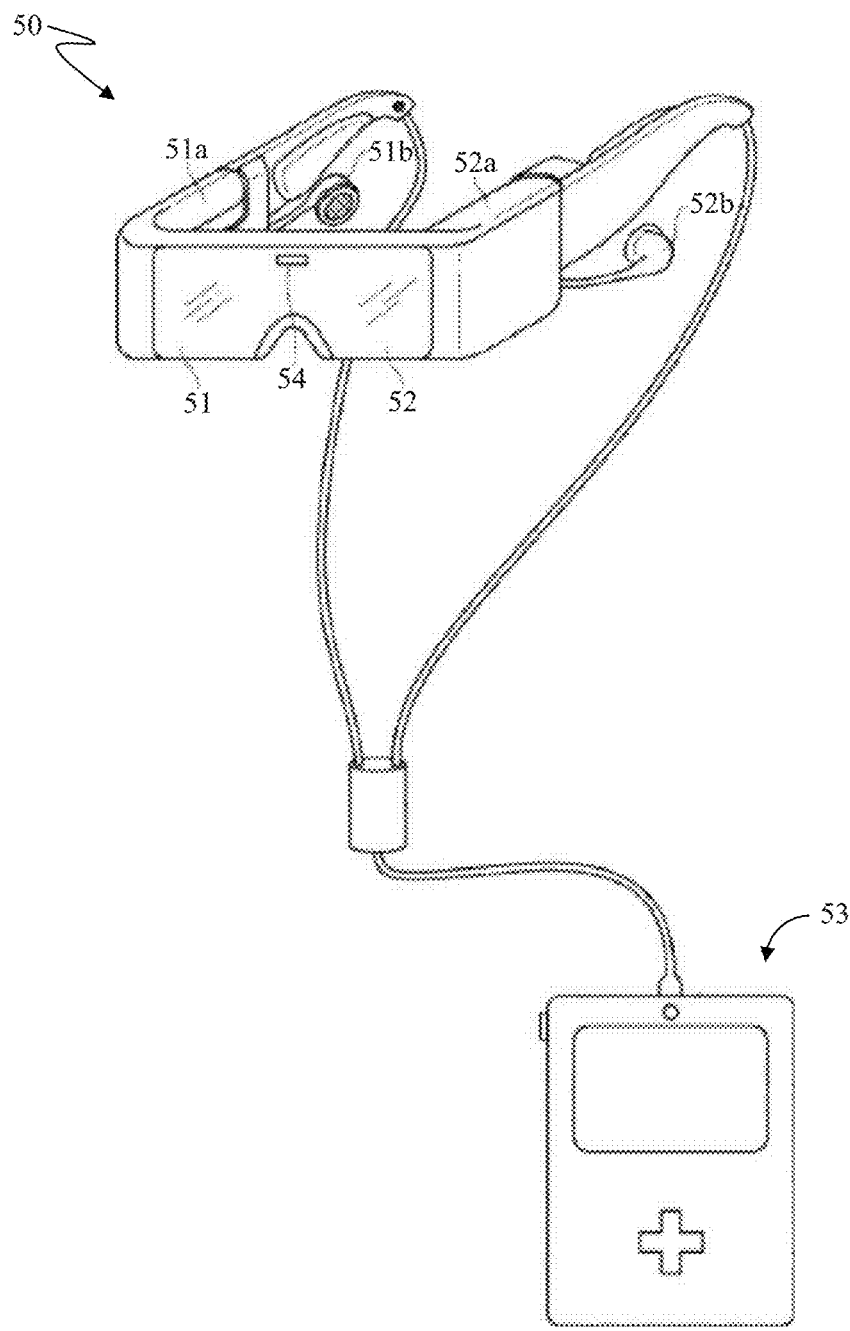
FIG. 24 illustrates an exemplary head-mounted display, HMD.

An example of an AR/VR HMD shown in FIG. 24. Exemplary HMD 50 is shown having a shape similar to eye glasses and may be worn in a manner similar to eye glasses. All computing resources may be incorporated into HMD 50, or alternatively may be divided between HMD 50 and an auxiliary control unit 53, or some other remote computing resource, e.g. a computer, server, etc. If desired, auxiliary control unit 53 may provide a user interface to control HMD 50. Alternatively, all user interface controls may be incorporated into HMD 50.

Preferably, HMD 50 includes a right optical see-through display unit 51 and a left optical see-through display unit 52 that work together to provide left and right images of a stereo image pair that displays a virtual 3D object. In the present case, a user would see both the displayed left and right images of the 3D virtual object and also see an outside scene through the left and right display units, 51 and 52. That is, left and right display units 51 and 52 can be made transparent in areas where the virtual object is not being actively displayed. If desired, a displayed virtual object can also be given a desired level of transparency so that a user may optionally see through a displayed virtual object. Left and right optical see-through display units 51 and 52 may provide an image by means of image projection, transparent OLED or LCD displays, or any other type of transparent displaying means known in the art.

In the present example, HMD 50 includes right earphone 51b and left earphone 52b to provide audio information to a user. Preferably right optical see-through display unit 51 is controlled by an integrated right display driving unit 51a, and left optical see-through display unit 52 is controlled by an integrated left display driving unit 52a.

In the present example, HMD 50 has one integrated camera 54 with known position and pose relative to the left and right optical see-through display units 51 and 52, and relative to predefined world coordinates. It is to be understood, however, that HMD 50 may optionally include two cameras to capture stereo imaging pairs, and thereby obtain 3D information of its surrounding real scene. Alternatively, HMD 50 may incorporate any other known 3D imaging system (i.e. 3D information capturing device) for capturing 3D information of the surrounding scene, such as a 3D laser scanner, a MICROSOFT CORP. KINECT sensor, a range camera, or any of many different types of time-of-flight devices. Further alternatively, one or more 3D information capturing devices may be distributed throughout the surrounding scene and their captured 3D information transmitted, or otherwise conveyed, to HMD 50 and/or auxiliary control unit 53.

A fuller description of an exemplary HMD is provided in U.S. Pub. No. 2013/0234914 assigned to the same assignee as the present application, and herein incorporated in its entirety by reference.

It is to be understood that any and all of the above-described methods and embodiments may be implemented in a computing device, such as personal computer or network server. Other examples of a computing device include a central processing unit (CPU), programmable logic device (PLD), complex programmable logic device (CPLD), application specific integrated circuit (ASIC) circuit, etc., all of which are well-known in the art, methods of integrating these computing devices with electronic memory stores and depth imaging devices (such as a stereo camera or a time-of-flight device) are also known in the art.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of determining a position and pose orientation of a physical target object in a scene, said method comprising:
   using a depth map image capture device to capture a depth map image of the target object in the scene;
   using a data processing device to implement the following steps:
   submitting the depth-map image to a first three-dimensional (3D) segmentation process to produce a set of first 3D segments of the same region of the depth-map image;
   submitting the set of first 3D segments to a second 3D segmentation process different from the first segmentation process, the second 3D segmentation process combining select groups of first 3D segments into combinations of first 3D segments, each combination of first 3D segments defining a 3D segment patch;
   submitting the segment patches to a third 3D segmentation process different than the first 3D segmentation process and the second 3D segmentation process, the third 3D segmentation process combining select 3D segment patches into combinations of 3D segment patches, each combination of 3D segment patches defining a segment hypothesis;
   using individual segment hypothesis as masks to isolate corresponding masked regions of the depth-map image;
   identifying one of the isolated masked regions based on a library of training 3D descriptors; and
   deriving a position and pose orientation of the target object based at least on the identified masked region.

2. The method of claim 1, wherein the third 3D segmentation process defines an adjacency matrix of all the 3D segment patches.

3. The method of claim 2, wherein the third 3D segmentation process defines a graph whose vertices are individual 3D segment patches, and uses the graph to construct the adjacency matrix.

4. The method of claim 2, wherein the adjacency matrix identifies segment patches whose minimum Euclidean distance in 3D space is not greater than a predefine threshold distance greater than zero as being adjacent.

5. The method of claim 2, wherein:
   the third 3D segmentation process defines a search tree based on adjacency of 3D segment patches as defined by the adjacency matrix, the search tree having a plurality of nodes and branches, each node being associated with a 3D segment patch;
   the third 3D segmentation process defines new combinations of 3D segment patches by traversing the branches of the search tree downward along a traverse path from a top-most node of the search tree, wherein each reached node in the traversing of a branch defines a new combination of 3D segment patches as the collection of 3D segment patches associated with a currently reached node plus all parent nodes up its current branch to the top-most node;
   the third 3D segmentation process submits each newly defined combination of 3D segment patches at each node along a current traverse path to a validity test that determines whether the new combination of 3D segment patches is valid or invalid;
   in response to the new combination of 3D segment patches being determined to be valid by the validity test, the new combination of 3D segment patches is output as a segment hypothesis and the third 3D segmentation process continues to a next node along the current traverse path,
   in response to the new combination of 3D segment patches not being determined to be valid by the validity test, the new combination of 3D segments is discarded and not issued as a segment hypothesis, traversing of the current traverse path is terminated, the third 3D segmentation process moves up the current branch until it encounters a fork in the search tree not previously traversed and then proceeds to traverse downward a previously not traversed branch from the encountered fork.

6. The method of claim 5, wherein the validity test includes determining if a current combination of 3D segment patches is novel, defined as not having previously been encountered in any previous traversing of the branches.

7. The method of claim 5, wherein the validity test includes criterion based on location and shape.

8. The method of claim 5, wherein the validity test includes determining if the size of a current combination of 3D segments is not less than a minimum size ($S_{lower}$) and not greater than a maximum size ($S_{upper}$).

9. The method of claim 8, wherein the minimum size is defined as two 3D segment patches.

10. The method of claim 9, wherein the maximum size is defined as four 3D segment patches.

11. The method of claim 1, wherein the third 3D segmentation process combines select 3D segment patches into segment hypotheses by:
    (a) selecting a random one of said 3D segment patches as a working patch for a current iteration;

(b) combining the working patch with a neighboring 3D segment patch to define a current patch combination;

(c) if the resultant size of the current patch combination is less than a minimum size ($S_{lower}$), then re-designating the current patch combination as the working patch and returning to step (b);

(d) if the resultant size of the current patch combination is greater than a maximum size ($S_{upper}$), then discarding the current patch combination and returning to step (a);

(e) if the current patch combination has not been encountered in any previous iteration, then defining the current patch combination is a segment hypothesis, and returning to step (b).

12. A robot implementing the method of claim 1, the robot having a manipulating arm, wherein the robot uses the method of claim 1 in a machine vision application to identify a target assembly component among a clutter of components, and uses the manipulating arm to pick up the identified target assembly component.

13. The method of claim 1, wherein each segment hypothesis includes at least half the volume of the target object.

14. The method of claim 1, wherein the first 3D segmentation process produces overlapping first 3D segments.

15. The method of claim 14, wherein the first 3D segments are supervoxels.

16. The method of claim 1, wherein the first 3D segmentation process is an over-segmentation process.

17. The method of claim 1, wherein the second 3D segmentation process is a local convexity connected patch method.

18. The method of claim 1, wherein the method is a machine vision method and the scene is a cluttered scene.

19. A machine vision system, comprising:

a depth map image capture device;

a manipulating arm for grasping a target object in a scene; and a data processing device determining a position and pose orientation of the target object in the scene, and controlling the manipulating arm based on the determined position and pose orientation, the data processing device implementing the following processing steps:

using the depth map image capture device to capture a depth map image of the target object in the scene, the captured depth map image being a depth-map test image;

submitting the depth-map test image to a first three-dimensional (3D) segmentation process multiple times, each submission of the first 3D segmentation process producing a corresponding, and independent, set of first 3D segments of the same region of the depth-map test image;

collecting all sets of first 3D segment pieces into a composite unit;

submitting the composite unit to a second 3D segmentation process different from the first segmentation process, the second 3D segmentation process combining select groups of first 3D segments from the composite unit into combinations of first 3D segments, each combination of first 3D segments defining a 3D segment patch;

submitting the segment patches to a third 3D segmentation process different than the first 3D segmentation process and the second 3D segmentation process, the third 3D segmentation process combining select 3D segment patches into combinations of 3D segment patches, each combination of segment patches defining a segment hypothesis;

using individual segment hypothesis as masks to isolate corresponding masked regions of the depth-map test image;

submitting each masked region of the depth-map test image to an object detection and pose estimation (ODPE) process, the ODPE process including a step of extracting test 3D descriptors from the submitted masked region of the depth-map test image and comparing the extracted test 3D descriptors to a library of training 3D descriptors to search for substantially matching 3D descriptors, the training 3D descriptors being extracted from training objects with known pose orientation, any submitted masked region of the depth-map that is identified as matching a training object by the ODPE being correlated to its matched training object, the identified masked region being identified as containing the target object, the location of the identified masked region being assigned to the target object, and the pose orientation of the identified masked region's correlated training object being assigned to the target object.

20. The machine vision system of claim 19, wherein:

the third 3D segmentation process defines an adjacency matrix of all the 3D segment patches;

the third 3D segmentation process defines a search tree based on adjacency of 3D segment patches as defined by the adjacency matrix, the search tree having a plurality of nodes and branches, each node being associated with a 3D segment patch;

the third 3D segmentation process defines new combinations of 3D segment patches by traversing the branches of the search tree downward along a traverse path from the top-most node of the search tree, wherein each reached node in the traversing of a branch defines a new combination of 3D segment patches as the collection of 3D segment patches associated with a currently reached node plus all parent nodes up its current branch to the top-most node;

the third 3D segmentation process submits each newly defined combination of 3D segment patches at each node along a current traverse path to a validity test that determines whether the new combination of 3D segment patches is valid or invalid;

if the new combination of 3D segment patches is determined to be valid by the validity test, then new combination of 3D segment patches is output as a segment hypothesis and the third 3D segmentation process continues to the next node along the current traverse path, else the new combination of 3D segments is discarded and not issued as a segment hypothesis, traversing of the current traverse path is terminated, the third 3D segmentation process moves up the current branch until it encounters a fork in the search tree not previously traversed and then proceeds to traverse downward a previously not traversed branch from the encountered fork.

* * * * *